US012583616B2

(12) United States Patent
Barsheshet et al.

(10) Patent No.: US 12,583,616 B2
(45) Date of Patent: Mar. 24, 2026

(54) BOOM MEMBER FOR REFUELING AIR VEHICLES

(71) Applicant: Israel Aerospace Industries Ltd., Lod (IL)

(72) Inventors: Moshe Barsheshet, Lod (IL); Lidor Yeger, Lod (IL); Jacob Fridman, Lod (IL)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 18/712,008

(22) PCT Filed: Dec. 12, 2022

(86) PCT No.: PCT/IL2022/051311
§ 371 (c)(1),
(2) Date: May 21, 2024

(87) PCT Pub. No.: WO2023/112023
PCT Pub. Date: Jun. 22, 2023

(65) Prior Publication Data
US 2025/0019087 A1 Jan. 16, 2025

(30) Foreign Application Priority Data

Dec. 16, 2021 (IL) ......................................... 289097

(51) Int. Cl.
*B64D 39/06* (2006.01)
*B64D 39/04* (2006.01)
(52) U.S. Cl.
CPC ............. *B64D 39/06* (2013.01); *B64D 39/04* (2013.01)

(58) Field of Classification Search
CPC ................................ B64D 39/06; B64D 39/04
See application file for complete search history.

(56) References Cited

U.S. PATENT DOCUMENTS 4,438,793 A 3/1984 Brown
5,601,380 A 2/1997 Guthrie et al.
(Continued)

FOREIGN PATENT DOCUMENTS

EP 1894840 A1 3/2008
EP 3342716 A1 7/2018
(Continued)

*Primary Examiner* — Magdalena Topolski
*Assistant Examiner* — Shanna Danielle Glover
(74) *Attorney, Agent, or Firm* — Ballard Spahr LLP

(57) ABSTRACT

A boom member for in-flight refueling includes a first boom member portion, a second boom member portion, and a connect/disconnect mechanism. The first boom member portion includes a first boom lumen, a first boom axis, and a fuel receiving end. The second boom member portion includes a second boom lumen, a second boom axis, and a fuel delivery end including a fuel delivery nozzle. The connect/disconnect mechanism is configured for: selectively enabling the first boom member portion to be connected with respect to the second boom member portion to provide a connected configuration; and, for selectively enabling actively disconnecting the first boom member portion with respect to the second boom member portion to provide a disconnected configuration responsive to receiving a disconnection activation signal.

20 Claims, 13 Drawing Sheets

(56)                    References Cited

U.S. PATENT DOCUMENTS

| | | | |
|---|---|---|---|
| 7,562,847 B2 | 7/2009 | Jones | |
| 7,661,725 B2 | 2/2010 | Kouda | |
| 9,802,712 B2 | 10/2017 | Blanco | |
| 10,099,799 B2 | 10/2018 | Hughes et al. | |
| 10,597,166 B2 | 3/2020 | Thornton et al. | |
| 2006/0011782 A1 | 1/2006 | Schroeder | |
| 2015/0284106 A1* | 10/2015 | Reinholdt | B64D 39/04 |
| | | | 244/135 A |
| 2016/0090188 A1* | 3/2016 | Blancp | B64D 39/06 |
| | | | 244/135 A |
| 2016/0221436 A1* | 8/2016 | Lindlbauer | F17D 5/02 |
| 2016/0318621 A1 | 11/2016 | Garruba | |
| 2020/0102203 A1* | 4/2020 | Dudar | F02M 25/0818 |

FOREIGN PATENT DOCUMENTS

| | | | |
|---|---|---|---|
| GB | 2237251 A | 5/1991 |
| WO | 2013102903 A2 | 7/2013 |
| WO | 2013102906 A2 | 7/2013 |

* cited by examiner

SECTION A-A

SECTION B-B

SECTION D-D

SECTION E-E

BOOM MEMBER FOR REFUELING AIR VEHICLES

TECHNOLOGICAL FIELD

The presently disclosed subject matter relates to in-flight refueling systems for refueling air vehicles, in particulars to boom-type in-flight refueling systems.

BACKGROUND

Airborne refueling (also referred to interchangeably herein as air refueling, in-flight refueling, air to air refueling (AAR), aerial refueling, tanking, and the like) refers to the process of transferring fuel from a tanker aircraft to a receiver aircraft during flight.

Two types of airborne refueling systems are currently in use for refueling airborne military aircraft:

the so-called "hose and drogue" system, used by the US Navy and many non-US air forces;

the so-called "boom and receptacle" or "flying boom" system, used by the US Air Force, and also used by Israel, Turkey and the Netherlands.

In the hose and drogue system, the refueling aircraft is provided with one or more non-rigid refueling lines, at the end of each of which there is a drogue which functions as a stabilizer and includes a receptacle, while the receiver aircraft is fitted with a probe that is configured for engaging with the receptacle. In use, the drogue is not actively controlled, but rather aligns itself freely in the airflow aft of the tanker. The pilot of the receiver aircraft controls the flight path thereof to ensure engaging contact between the probe and the receptacle. Thereafter, the receiver aircraft is refueled via the refueling line and probe.

In the conventional boom and receptacle system, the tanker includes a so-called "flying boom", which is a rigid tube that telescopes outwardly and is gimbaled to the rear of the tanker aircraft, and is otherwise retracted towards the tanker fuselage when not in use. The boom carries a fuel line and comprises a fuel transfer nozzle at the end thereof, and the boom is equipped with adjustable flight control surfaces. Once the tanker and receiver aircraft are in close proximity and flying in formation, with the receiver aircraft at a position behind the tanker within an air refueling envelope (i.e., safe limits of travel for the boom with respect to the receiver aircraft and within which contact between the receiving aircraft and the boom is safe), a dedicated operator in the tanker controls the position of the boom via the control surfaces, and inserts the end of the boom including the nozzle into a receptacle provided on an upper part of the receiving aircraft, ensuring proper mating between the nozzle and receptacle, after which fuel transfer can begin. During refueling, and while the boom is engaged with the receptacle, the pilot of the receiver aircraft must continue to fly within the air refueling envelope, and if the receiver aircraft approaches these limits the operator in the tanker requires the receiver aircraft pilot to correct the position thereof, and if necessary the boom is disconnected to prevent accidents. All current tankers of this type carry a single boom and can refuel a single receiver aircraft of this type at a time.

In addition, there are some tankers that comprise a flying boom system and at least one hose and drogue system as well, and are commonly known as Multi-Point Refueling Systems (MPRS). In some cases a hose and drogue system is provided at the aircraft tail, and thus only this system or the flying boom system may be used at any one time. In other cases, two under-wing hose and drogue pods, known as Wing Air Refueling Pods (WARPs), can be provided, one under each wing, in addition to the flying boom system.

By way of general background, WO 2013/102903 and WO 2013/102906 to the present Assignee disclose a variety of refueling devices, systems and methods for use in in-flight refueling. In one example one such device is towed by a tanker aircraft via a fuel hose at least during in-flight refueling, and has a boom member with a boom axis. The boom member enables fuel to be transferred from the fuel hose to a receiver aircraft along the boom axis during in-flight refueling. The device maintains a desired non-zero angular disposition between the boom axis and a forward direction at least when the refueling device is towed by the tanker aircraft in the forward direction via the fuel hose.

Also by way of general background, U.S. Pat. No. 7,562, 847 discloses an autonomous in-flight refueling hose end unit including a first end configured to be coupled to a fuel hose of a tanker aircraft. and a second end configured to be coupled to receiver aircraft and adjustable control surfaces, and a flight control computer autonomously controls the control surfaces to fly the refueling hose end into contact with the receiver aircraft.

Also by way of general background, in GB 2,237,251 an in-flight refueling apparatus mountable on a tanker aircraft has a probe receptor coupled with a fuel line and is arranged to be deployed outboard of the aircraft, and can be provided on a drogue or a boom. In one mode, the apparatus is arranged to provide a parameter which is representative of the deviation of the path of the receptor from a predetermined initial path for actuating control means for changing automatically the position of the receptor relative to the initial path. In another mode, a parameter which is representative of the relative angular position of the receptor with respect to the probe of an approaching refueling aircraft for actuating control means for changing automatically the relative angular position to achieve alignment of receptor and probe.

Acknowledgement of the above references herein is not to be inferred as meaning that these are in any way relevant to the patentability of the presently disclosed subject matter.

GENERAL DESCRIPTION

According to a first aspect of the presently disclosed subject matter there is provided a boom member configured for enabling in-flight refueling of a receiver aircraft, the boom member comprising a first boom member portion, a second boom member portion, and a connect/disconnect mechanism:

the first boom member portion including a first boom lumen, a first boom axis, and a fuel receiving end, the fuel receiving end configured for receiving fuel from a fuel source and for enabling delivering fuel via the first boom lumen;

the second boom member portion including a second boom lumen, a second boom axis, and a fuel delivery end, the fuel delivery end comprising a fuel delivery nozzle configured for selectively engaging with a fuel receptacle of the receiver aircraft;

the connect/disconnect mechanism being configured for:

selectively enabling the first boom member portion to be connected with respect to the second boom member portion to provide a connected configuration, such that free fluid communication is provided between the first boom lumen and the second boom lumen; and selectively enabling actively disconnecting the first boom member portion with respect to the second boom member portion to provide a disconnected configuration responsive to receiving a disconnection activation signal.

For example, said connect/disconnect mechanism has a normally said connected configuration, and wherein said connect/disconnect mechanism is electrically actuated via said disconnection activation signal to provide said disconnected configuration.

Additionally or alternatively, for example, said connect/ disconnect mechanism comprises a mechanical coupling arrangement and an electrically actuable locking mechanism, wherein the mechanical coupling arrangement comprises a first coupling element affixed to the first boom member portion, a second coupling element affixed to the second boom member portion, and wherein the electrically actuable locking mechanism is configured for selectively locking together the first coupling element with respect to the second coupling element in said connected configuration when the electrically actuable locking mechanism deactivated, and for selectively unlocking the first coupling element with respect to the second coupling element in said disconnected configuration when the electrically actuable locking mechanism is electrically activated via said disconnection activation signal. For example, the first coupling element comprises a first cylindrical flange and the second coupling element comprises a second cylindrical flange, wherein in the connected configuration the first cylindrical flange and the second cylindrical flange are co-axial with respect to said second boom axis, and in sealing engagement with respect to one another. Additionally or alternatively, for example, the electrically actuable locking mechanism further comprises a plurality of locking elements and is configured for:

enabling said locking elements to lock together the first cylindrical flange and the second cylindrical flange in said connected configuration when the first cylindrical flange and the second cylindrical flange are in a first relative position with respect to one another; and enabling said locking elements to unlock the first cylindrical flange and the second cylindrical flange in said connected configuration when the first cylindrical flange and the second cylindrical flange are in a second relative position with respect to one another.

For example, said locking elements are in the form of a plurality of balls, each ball having a nominally identical respective ball diameter, and wherein said first cylindrical flange comprises a first outer surface and a first inner surface, radially spaced from one another by a first flange thickness, and wherein said first cylindrical flange comprises a plurality of ball chambers in circumferentially arranged relationship therewith, each said ball chamber accommodating one said ball, wherein said first cylindrical flange further comprises a through-opening to said first inner surface to allow only a part of each corresponding ball accommodated in the respective said ball chamber to project out of the respective said through-opening, wherein said radial thickness is less than each said ball diameter, and wherein said coupling system further comprises a collar movably mounted with respect to the first cylindrical flange and in overlying relationship with the first outer surface, the collar comprising a plurality of recesses corresponding to said plurality of ball chambers, and wherein said collar is movable between a locking position and an unlocking position, wherein in the locking position the collar locks the balls in a projecting position with respect to each respective said opening, and wherein in said unlocking position the collar enables the balls to recess into the respective ball chambers away from the respective projecting positions.

For example, in said unlocking position said recesses are in radial alignment with respect to said ball chambers, and wherein in said locking position said recesses are radially non-aligned with respect to said ball chambers.

Additionally or alternatively, for example, each said recess is sized such as to enable a respective said ball to be radially displaced thereinto and away from the respective projecting position.

Additionally or alternatively, for example, said second cylindrical flange comprises a second outer surface comprising a plurality of locking grooves in circumferentially arranged relationship therewith, such that in said locking position each said ball projects away from each respective said opening in a respective said projecting position and into a locking configuration with a respect said locking groove, such as to prevent relative movement between said first cylindrical flange and said second cylindrical flange.

Additionally or alternatively, for example, said collar comprises a mechanical stop, and said electrically actuable locking mechanism comprises a release solenoid arrangement configured for selectively cooperating with the mechanical stop, such that in the absence of said disconnection activation signal the release solenoid arrangement prevents movement of the collar from the locking position, and such that in response to said disconnection activation signal the release solenoid arrangement allows movement of the collar from the locking position to the unlocking position. For example, said release solenoid arrangement comprises a solenoid and a piston element reciprocable between a first position, corresponding to said locking position, and a second position, corresponding to said unlocking position, responsive to said solenoid being energized via said disconnection activation signal, the piston element comprising a retaining pin configured for selectively cooperating with said mechanical stop, and a biasing spring configured for biasing the piston element into the second position Additionally or alternatively, for example, said collar is biased into the unlocking position. For example, the boom member comprises a torsion spring mounted at one longitudinal end thereof to said first cylindrical flange and at another longitudinal end thereof to said collar, and configured for biasing the collar into the unlocking position.

Additionally or alternatively, for example, the collar is rotatably mounted with respect to the first cylindrical flange about a reference axis, between a first angular position corresponding to said locking position and a second angular position corresponding to said unlocking position, wherein said reference axis is co-axial with said second boom axis.

Alternatively, for example, the collar is axially mounted with respect to the first cylindrical flange along a reference axis, between a first axial position corresponding to said locking position and a second axial position corresponding to said unlocking position, wherein said reference axis is co-axial with said second boom axis.

Alternatively, for example, the collar is axially and rotatably mounted with respect to the first cylindrical flange with respect to a reference axis, between a first axial/angular position corresponding to said locking position and a second axial/angular position corresponding to said unlocking position, wherein said reference axis is co-axial with said second boom axis.

Additionally or alternatively, for example, at least an aft part of the first boom member portion, and at least a forward part of the second boom member portion are rectilinear and co-axial with respect to one another. For example, the second boom member portion comprises a fore part connected to the aft part via an elbow portion; alternatively, for example, the second boom member portion is rectilinear.

Additionally or alternatively, for example, said connect/disconnect mechanism is configured for enabling selective active disconnection between the receiver aircraft and the refueling device in an essentially non-destructive manner, and in which the second boom member portion remains engaged in the receiver aircraft after such disconnection.

Additionally or alternatively, for example, said connect/disconnect mechanism is configured for enabling selective active disconnection between the receiver aircraft and the refueling device in-flight.

Additionally or alternatively, for example, said connect/disconnect mechanism is configured for enabling reversible disconnection between the receiver aircraft and the refueling device.

According to a second aspect of the presently disclosed subject matter there is provided a refueling device for use in in-flight refueling operation, comprising:

(a) a body configured for being towed by a tanker aircraft in a forward direction via a fuel hose at least during in-flight refueling operation, the body having a body longitudinal axis;
  (b) spatial control system configured for selectively providing stability and control to the refueling device;
  (c) a boom member as defined herein regarding aforementioned first aspect of the presently disclosed subject matter, the boom member being carried by the body.

For example, the boom member is reversibly pivotable with respect to the body, between a boom stowed position and a boom deployed position, wherein in the boom stowed position the refueling nozzle is closer to the body than in the boom deployed position, and wherein in the boom deployed position engagement with the fuel receptacle of the receiver aircraft is possible. Alternatively, for example, said boom member is in fixed spatial relationship with respect to the body.

Additionally or alternatively, for example, said spatial control system is further configured for selectively providing control moments in at least one of pitch, yaw and roll wherein to enable the refueling device to be flown while towed by the tanker aircraft in said forward direction via said fuel hose.

Additionally or alternatively, for example, said spatial control system comprises selectively controllable aerodynamic control system. For example, said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces. For example, said forward set of aerodynamic control surfaces comprises a canard configuration, and said aft set of aerodynamic control surfaces comprises one or more wing elements. Additionally or alternatively, for example, said aft set of aerodynamic control surfaces comprises an H-wing configuration, comprising two vertical wing stabilizers, one each on either side of a respective wing.

Additionally or alternatively, for example, said forward set of aerodynamic control surfaces comprises an H-canard configuration, comprising two vertical canard stabilizers, one each on either side of a respective canard.

Additionally or alternatively, for example, said spatial control system is configured for enabling the refueling device to be steered in one, or two, or three degrees of freedom in translation, and in one, or two, or three degrees of freedom in rotation, independently of the tanker aircraft or of the refueling aircraft.

Additionally or alternatively, for example, said body further comprises a longitudinal displacement control system, different from the spatial control system.

Additionally or alternatively, for example, the refueling device further comprises a force generating arrangement configured for selectively generating a force along said second boom axis in a direction towards said fuel delivery nozzle. For example, said force generating arrangement is configured for selectively generating said force along said second boom axis in a direction towards said fuel delivery nozzle responsive to said fuel delivery nozzle being in predetermined proximity to the fuel receptacle of the receiver aircraft wherein to force said fuel delivery nozzle into engagement with the fuel receptacle.

Additionally or alternatively, for example, said body comprising a fuel delivery lumen configured for fluid communication with said fuel hose and said boom member at least during the in-flight refueling operation, wherein said body comprises a coupling having a hose interface configured for connecting said lumen to the fuel hose, said coupling configured for allowing relative rotation between the hose and said body in at least one degree of freedom while maintaining said fuel communication.

Additionally or alternatively, for example, the refueling device further comprises a data acquisition system configured for providing spatial data relating to a relative spatial disposition between said fuel delivery nozzle and said fuel receptacle, to enable selectively controlling the refueling device to provide automatic or autonomous or manual engagement of the fuel delivery nozzle to the fuel receptacle of the receiver aircraft.

Additionally or alternatively, for example, the refueling device further comprises a suitable controller for controlling operation thereof.

According to a third aspect of the presently disclosed subject matter there is provided a refueling system comprising a refueling fuel reservoir connected to a refueling device via a hose, the refueling device being as defined herein regarding the aforementioned second aspect of the presently disclosed subject matter.

According to a fourth aspect of the presently disclosed subject matter there is provided a tanker aircraft comprising at least one refueling system as defined herein regarding the aforementioned third aspect of the presently disclosed subject matter.

According to a fifth aspect of the presently disclosed subject matter there is provided a method for in-flight refueling, comprising:

providing a tanker aircraft as defined herein regarding the aforementioned fourth aspect of the presently disclosed subject matter;
  deploying the refueling device aft of the tanker aircraft when airborne;
  engaging the fuel delivery nozzle to a receiver aircraft;
  selectively providing said disconnection activation signal to the boom member to thereby disconnect the first boom member portion with respect to the second boom member portion to provide said disconnected configuration;
  allowing the receiving aircraft to separate from the respective said body while said delivery nozzle is engaged to said receiver aircraft.

A feature of at least one example of the presently disclosed subject matter is that there is provided a refueling device that enables emergency disconnection or any other desired selective disconnection between the receiver aircraft and the refueling system in cases where it is not possible to disengage the fuel delivery nozzle from the receiver aircraft.

Another feature of at least one example of the presently disclosed subject matter is that there is provided a refueling device that enables emergency disconnection or any other desired selective disconnection between the receiver aircraft and the refueling system, in which such disconnection is essentially non-destructive while leaving the fuel delivery nozzle engaged with the receiver aircraft.

Another feature of at least one example of the presently disclosed subject matter is that there is provided a refueling device that enables emergency disconnection or any other desired selective disconnection between the receiver aircraft and the refueling system, in which such disconnection can be carried out independently of the mechanical loads between the fuel delivery nozzle and the receiver aircraft.

Another feature of at least one example of the presently disclosed subject matter is that there is provided a refueling device that enables emergency disconnection or any other desired selective disconnection between the receiver aircraft and the refueling system, in which such disconnection can be carried out under conditions wherein the mechanical loads between the fuel delivery nozzle and the receiver aircraft are in the order of nominal in-flight refueling loads.

Another feature of at least one example of the presently disclosed subject matter is that there is provided a refueling device that enables emergency disconnection or any other desired selective disconnection between the receiver aircraft and the refueling system, in which the connect/disconnect mechanism is integrated in the boom member.

Another feature of at least one example of the presently disclosed subject matter is that there is provided a refueling device that enables emergency disconnection or any other desired selective disconnection between the receiver aircraft and the refueling system, in which the connect/disconnect mechanism can be assembled, and held in a preloaded position via an engaged locking pin. Typically, setting the preloaded position is carried out only on first installation of the connect/disconnect mechanism.

Another feature of at least one example of the presently disclosed subject matter is that there is provided a refueling device that enables emergency disconnection or any other desired selective disconnection between the receiver aircraft and the refueling system, in which the connect/disconnect mechanism can have no or little maintenance requirements.

Another feature of at least one example of the presently disclosed subject matter is that there is provided a refueling device that enables emergency disconnection or any other desired selective disconnection between the receiver aircraft and the refueling system, in which the connect/disconnect mechanism can be used in failure events, for example including any form of mechanical jam during disengagement of the boom member from the receiver aircraft, and/or for example arising from electrical command malfunction or release malfunction.

Another feature of at least one example of the presently disclosed subject matter is that there is provided a refueling device that enables emergency disconnection or any other desired selective disconnection between the receiver aircraft and the refueling system, in which the connect/disconnect mechanism can be used to essentially by-pass a jammed nozzle by essentially separating the nozzle from the remainder of the boom member.

Another feature of at least one example of the presently disclosed subject matter is that there is provided a refueling device that enables emergency disconnection or any other desired selective disconnection between the receiver aircraft and the refueling system, in which the connect/disconnect mechanism can be operated only by the boom operator.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1(*b*) is an aft-top isometric view of the refueling device according to the example of FIG. 1(*a*), with the boom member in the retracted position.

FIG. 9(*b*) is a longitudinal cross-sectional view of the example of FIG. 9(*a*) taken along D-D, in locking position.

FIG. 10(*b*) is a longitudinal cross-sectional view of the example of FIG. 10(*a*) taken along E-E, in unlocking position.

DETAILED DESCRIPTION

Referring to FIGS. 1(*a*) and 1(*b*), a refueling device for use in in-flight refueling operation, according to one example of the presently disclosed subject matter, generally designated 100, comprises a body 110, a boom member 130, and a spatial control system 160.

Figure 2:
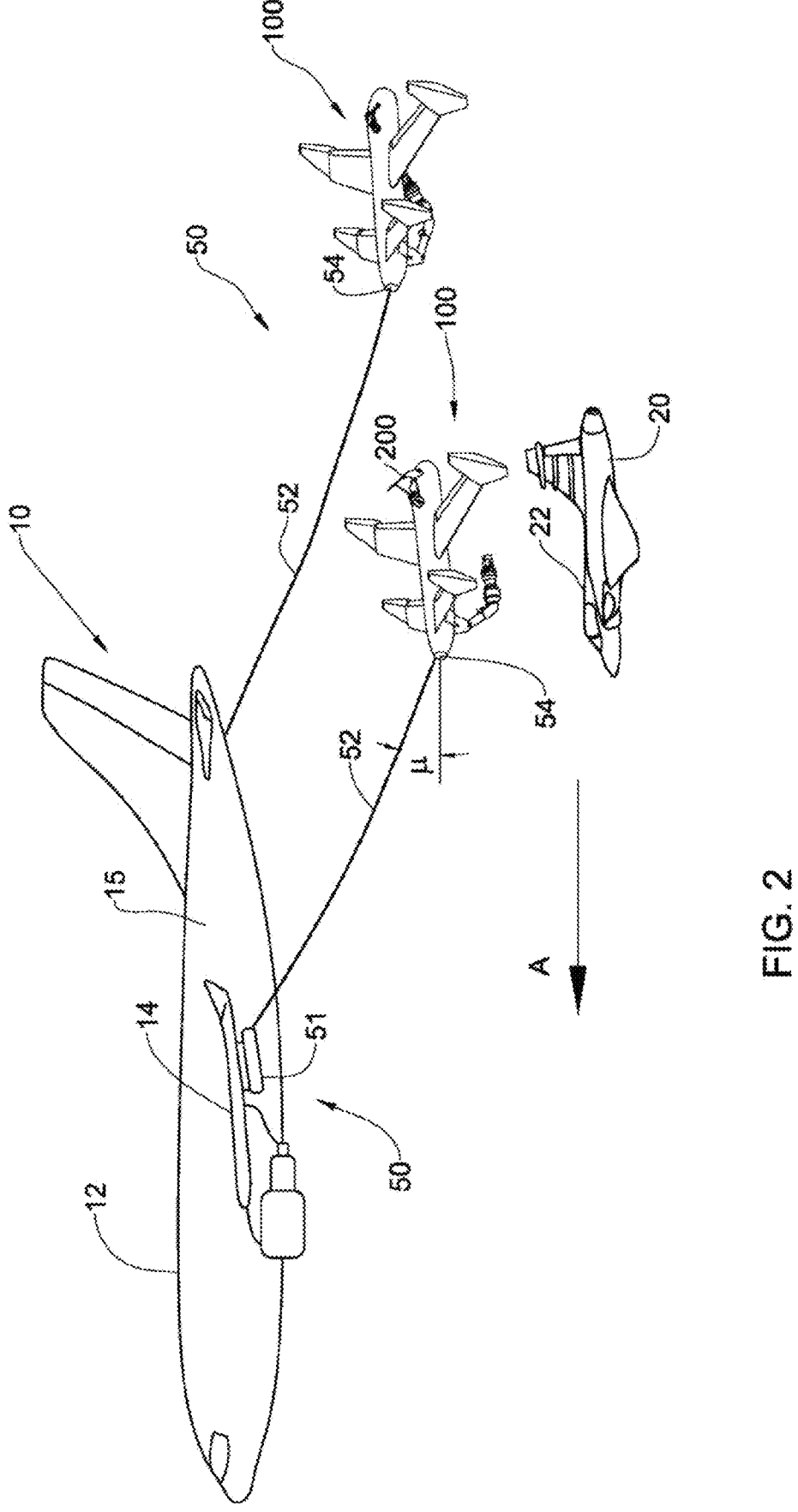
FIG. 2 is a side view of a tanker system according to an example of the presently disclosed subject matter.

As will become clearer herein, and referring also to FIG. 2, the refueling device 100, and in particular the body 110 is configured for being towed by a tanker aircraft 12 in a forward direction A via a fuel hose 52 at least during in-flight refueling operation.

For convenience, and referring again to FIGS. 1(*a*) and 1(*b*), a roll axis R, a pitch axis P and a yaw axis Y can be conventionally defined with respect to the refueling device 100.

The roll axis R is parallel to or co-axial with the longitudinal axis LAB of the device 100; the pitch axis P is generally in lateral and orthogonal relationship to the roll axis R (i.e., parallel to the horizontal when the body is at a zero roll angle); and yaw axis Y is in generally in transverse and orthogonal relationship to the roll axis R and the pitch axis P (i.e., parallel to the vertical when the body is at a zero pitch angle).

Figure 3:
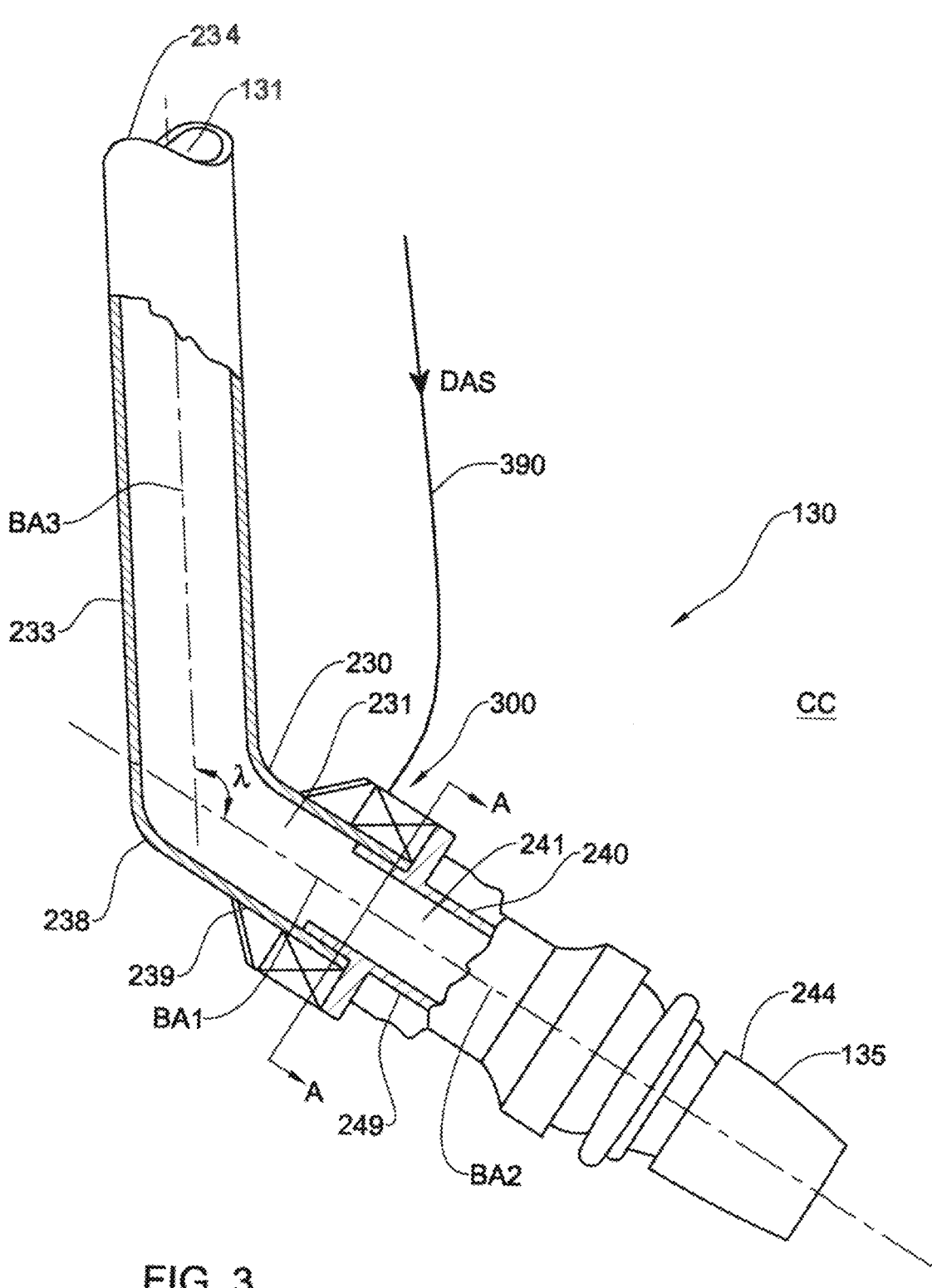
FIG. 3 is a transverse partial cross-sectional side view of the boom member of the example of FIG. 1(*a*).

According to an aspect of the presently disclosed subject matter, and referring also to FIG. 3, the boom member 130 is configured for enabling in-flight refueling of a receiver aircraft 20, the boom member comprising first boom member portion 230, a second boom member portion 240, and a connect/disconnect mechanism 300. According to this aspect of the presently disclosed subject matter, and also as will become clearer herein, the boom member 130 enables selective active disconnection between the receiver aircraft 20 and the refueling device 100 (and thus from the tanker aircraft 12) in a variety of situations, for example in an emergency for example in which the boom member 130 can become jammed with the receiver aircraft 20.

According to this aspect of the presently disclosed subject matter, the connect/disconnect mechanism 300 is configured for enabling selective active disconnection between the receiver aircraft 20 and the refueling device 100 in an essentially non-destructive manner, and in which the second boom member portion 240 remains engaged in the receiver aircraft 12 after such disconnection. By "essentially non-destructive manner" is meant that at least the first boom member portion 230, the second boom member portion 240, and the connect/disconnect mechanism 300 are not damaged per se by such disconnection, and in at least in some examples these components can be fully or partially reconnected. For example, some damage to other parts of the refueling system can occur in at least some cases, for example in at least some cases the electrical harness 199 (see FIG. 4 and FIG. 7) can be torn during switch disconnection.

According to this aspect of the presently disclosed subject matter, the connect/disconnect mechanism 300 is configured for enabling selective active disconnection between the receiver aircraft 20 and the refueling device 100 in-flight, i.e., while the receiver aircraft 20 and the refueling device 100 are both airborne, and in which the second boom member portion 240 remains engaged in the airborne receiver aircraft 12 after such disconnection.

Furthermore, according to this aspect of the presently disclosed subject matter, the connect/disconnect mechanism 300 is configured for enabling reversible disconnection between the receiver aircraft 20 and the refueling device 100, thereby enabling the same or another said second boom member portion 240 to be subsequently re-connected to the remainder of the boom member 130, for example by ground crews.

Without being bound to theory, it is to be noted that particularly in the context of the towable refueling device 100, such a refueling device 100 can have a mass that is significantly less than the mass of the receiver aircraft 20, and thus in undesired situations in which for example regular disengagement of the boom member 130 from the receiver aircraft is compromised, simply applying sharp maneuvers to the receiver aircraft 20 can be considered in at least some cases to have low probability of success in terms of disengaging the boom member 130 from the receiver aircraft 20.

The boom member 130 is carried by the body 110, and in particular the boom member 130 is mounted to the body 110 via the first boom member portion 230

The boom member 130 comprises a fuel delivery nozzle 135, the fuel delivery nozzle 135 being configured for selectively engaging with a fuel receptacle 22 (FIG. 1(*a*)) in the receiver aircraft 20 to enable fuel to be transferred from the fuel hose 52 to the receiver aircraft 20 along during the in-flight refueling operation. The nozzle 135 thus can comprise any conventional design of such nozzles, which are well known in the art, or indeed can comprise any other current or future design of such an in-flight refueling nozzle.

Furthermore, the spatial control system 160 is configured for selectively providing stability and control to the refueling device 100.

The boom member 130 comprises a boom member lumen 131 for providing fluid communication between the fuel delivery nozzle 135 and the fuel delivery lumen 120.

While in at least this example, the boom member 130 is configured as an elbowed boom, in alternative variations of this example the boom member can instead be configured as a rectilinear boom member having a single rectilinear boom axis therethrough, or as a partially curved boom member. In any case, at least an aft part 239 of the first boom member portion 230, and at least a forward part 249 of the second boom member portion 240, are rectilinear and co-axial with respect to one another.

Thus, in at least this example, the second boom member portion 240, including the forward part 249, is rectilinear and includes a second boom lumen 241, a second boom axis BA2, and a fuel delivery end 244, the fuel delivery end comprising the fuel delivery nozzle 135, which as discussed above is configured for selectively engaging with a fuel receptacle 22 of the receiver aircraft 20.

Also in at least this example, the first boom member portion 230 includes a fore part 233 connected to the aft part 239 via elbow portion 238. The first boom member portion 230 includes a first boom lumen 231, and a fuel receiving end 234, the fuel receiving end 234 being configured for receiving fuel from a fuel source, in at least this example from the tanker aircraft via the fuel delivery lumen 120 and for enabling delivering fuel to the second boom member portion 240 via the first boom lumen 231.

The first boom member portion 230, in particular the aft part 239, includes a first boom axis BA1, which at least in this example is parallel, and in particular co-axial, with second boom axis BA2. The fore part 233 has a third boom axis BA3, that is at an elbow angle λ with respect to the first boom axis BA1.

While in at least this example, the first boom member portion 230 and the second boom member portion 240 are each configured as rectilinear, rigid and generally tubular components, in alternative variations of this example, part of the first boom member portion, for example the fore part 233 and/or the elbow portion 238 can be configured as a non-rectilinear and/or non-rigid and/or non-tubular component. For example, in such alternative variations of this example, the fore part 233 and/or the elbow portion 238 can be configured as a flexible hose connected to the aft portion 239 for example.

Elbow angle λ can be defined on a plane, typically a plane parallel to the plane including the yaw axis Y and the roll axis R of the device 100. In at least this example λ is any suitable angle in the range between 60° and 120°.

In at least this example, the boom member 130 is pivotably mounted to the body 110 via the first boom member portion 132, at hinge axis C. Thus, and referring in particular to FIG. 1(*a*) and FIG. 1(*b*), the boom member 130 is pivotable between a boom retracted position RP and a boom deployed position DP, wherein in the retracted position RP the fuel delivery nozzle 135 is located closer with respect to the body 110 than in the deployed position DP.

Furthermore, in at least this example, in the deployed position DP the second boom axis BA2 is at a first angular disposition with respect to the body longitudinal axis LAB, while in the retracted position RP the aft boom axis BA2 is at a second angular disposition with respect to the body longitudinal axis LAB, wherein the first angular disposition is different from the second angular disposition.

In any case, in general the boom member 130 is in the deployed position DP at least during in-flight refueling operation of the device 100.

A suitable actuation mechanism (not shown) is provided for controllably pivoting the boom member 130 between the stowed or retracted position RP and the deployed position DP.

As will become clearer herein, the connect/disconnect mechanism 300 is configured for:

selectively enabling the first boom member portion 230 to be connected with respect to the second boom member portion 240 to provide a connected configuration CC, such that free fluid communication is provided between the first boom lumen 231 and the second boom lumen 241; and selectively enabling active disconnection of the first boom member portion 231 with respect to the second boom member portion 241 to provide a disconnected configuration DC responsive to receiving a disconnection activation signal DAS.

In the connected configuration CC, the first boom lumen 231 and the second boom lumen 241 together form the boom lumen 131. This enables fuel to be provided to the receiver aircraft 20, when engaged to the fuel delivery nozzle 135, in the normal manner.

On the other hand, in the disconnected configuration DC the second boom member portion 230 is fully detached from (and thus no longer physically connected directly to) the first boom member portion 240, such that the receiver aircraft 20, with the second boom portion 240 still engaged thereto, is fully disconnected from the remainder of the refueling device 100, and can then fly independently thereof.

Thus, the connect/disconnect mechanism 300 has a normally connected configuration CC, and in at least this example the connect/disconnect mechanism 300 is electrically actuated via the aforesaid disconnection activation signal DAS to provide the disconnected configuration DC.

Figure 4:
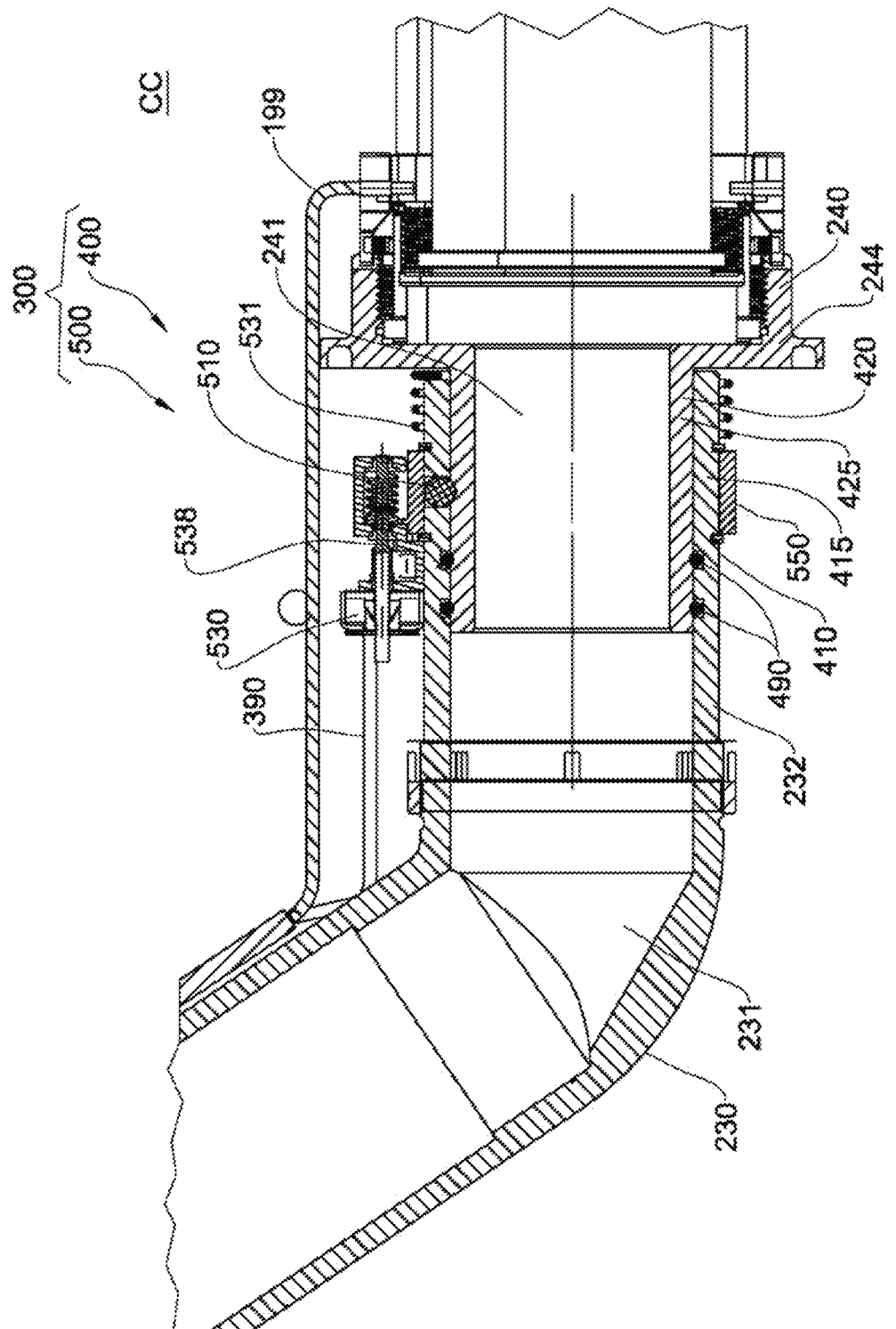
FIG. 4 is a transverse cross-sectional side view of part of the boom member of the example of FIG. 1(*a*), in connected configuration.
Figure 7:
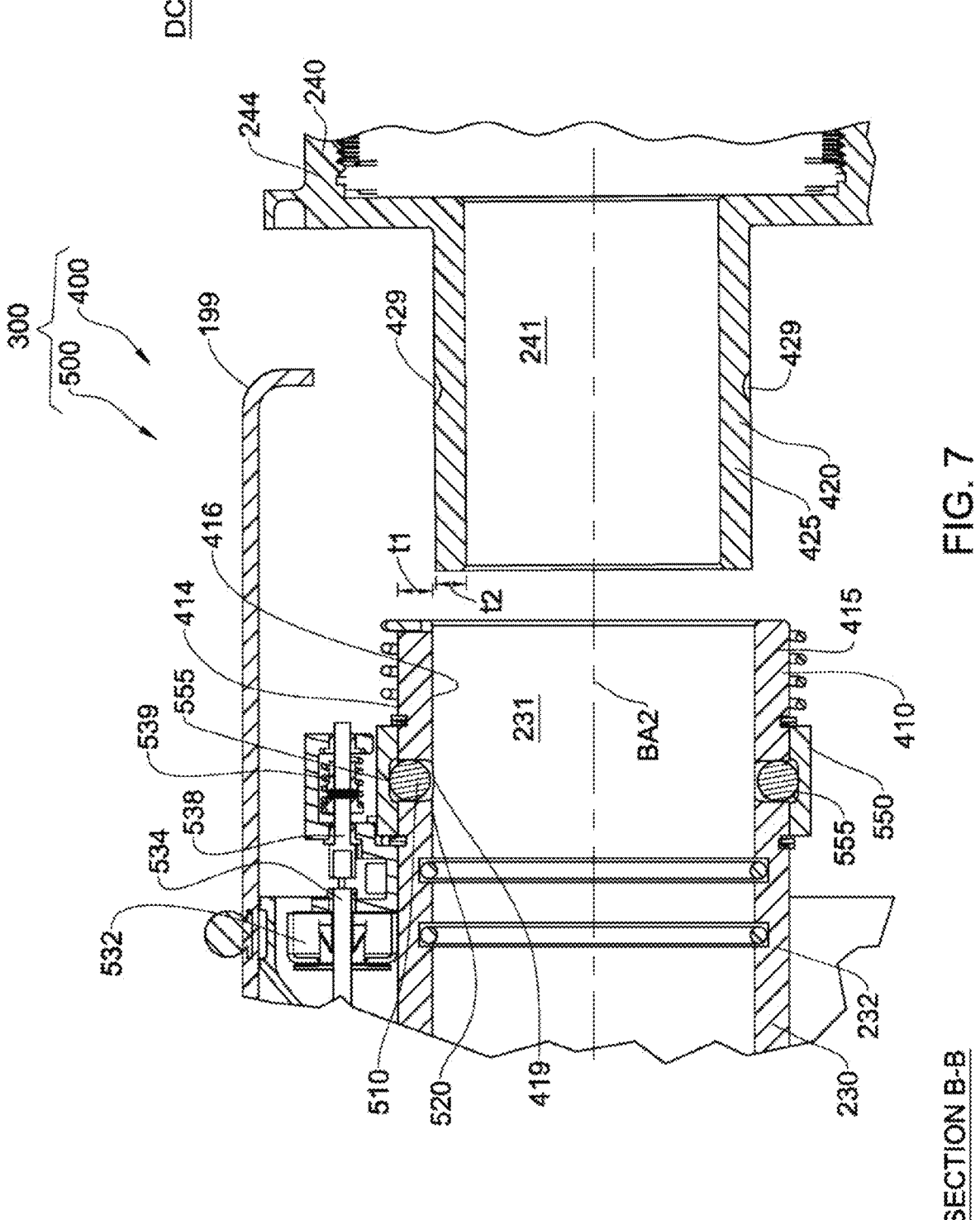
FIG. 7 is a transverse cross-sectional side view of part of the boom member of the example of FIG. 6 taken along B-B, in disconnected configuration.

Referring also to FIG. 4 and FIG. 7, in at least this example the connect/disconnect mechanism 300 comprises a mechanical coupling arrangement 400 and an electrically actuable locking mechanism 500.

The mechanical coupling arrangement 400 comprises a first coupling element 410 affixed to the first boom member portion 230, and a second coupling element 420 affixed to the second boom member portion 240.

The first coupling element 410 is affixed to the first boom member portion 230 at an aft end 232 thereof, and the second coupling element 420 affixed to the second boom member portion 240 at a forward end 244 thereof.

The first coupling element 410 comprises a first cylindrical flange 415 and the second coupling element 420 comprises a second cylindrical flange 425. In the connected configuration the first cylindrical flange 415 and the second cylindrical flange 425 are co-axial with respect to the second boom axis BA2, and in sealing engagement with respect to one another, for example via sealing rings 490.

The first cylindrical flange 415 comprises a first outer surface 414 and a first inner surface 416, radially spaced from one another by a first flange thickness t1.

The second cylindrical flange 425 comprises a second outer surface 424 and a second inner surface 426, radially spaced from one another by a second flange thickness t2. The second inner surface 426 defines part of the second boom lumen 241.

Figure 5:
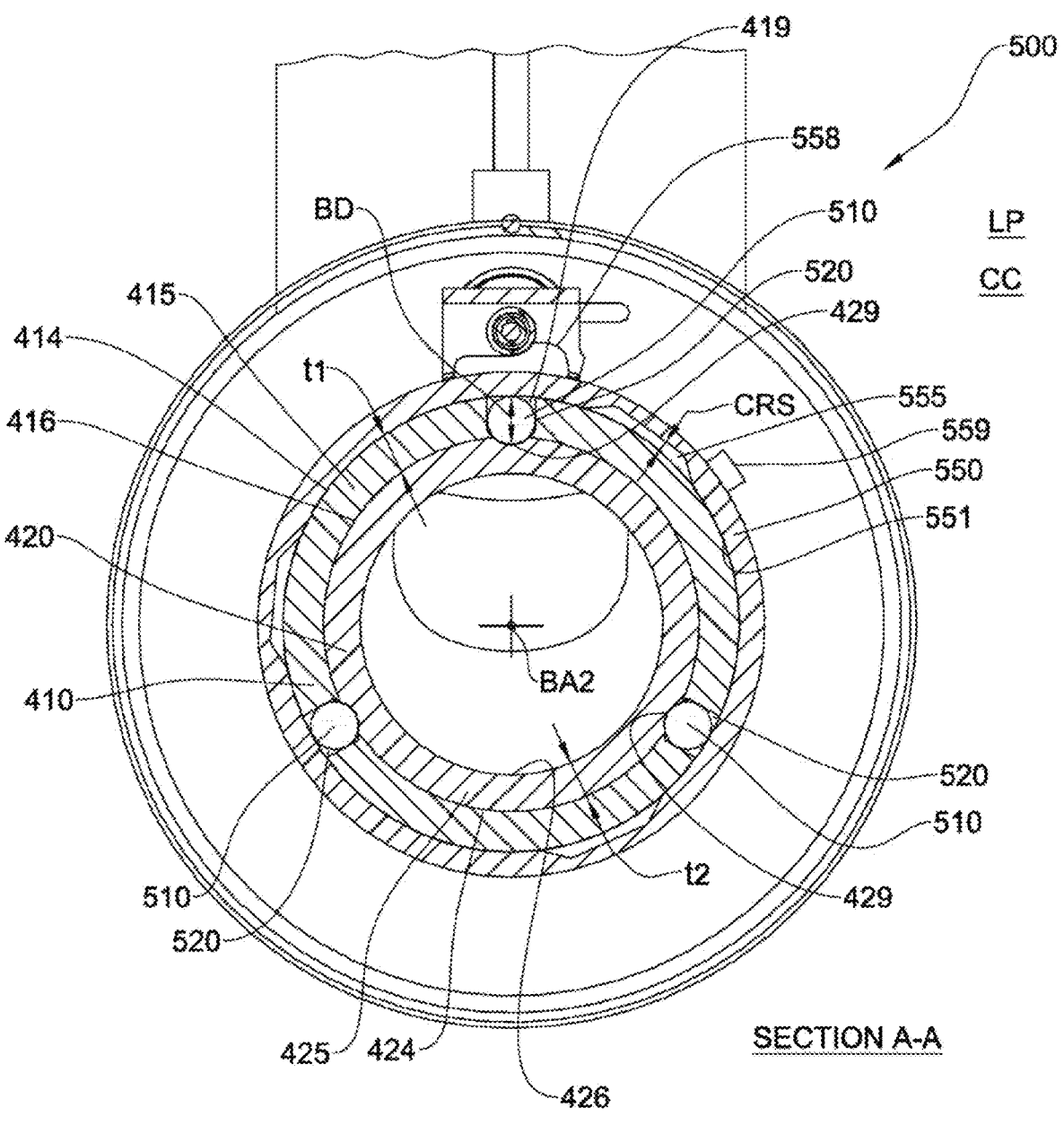
FIG. 5 is a longitudinal cross-sectional view of the example of FIG. 3 taken along A-A, in locking position.
Figure 6:
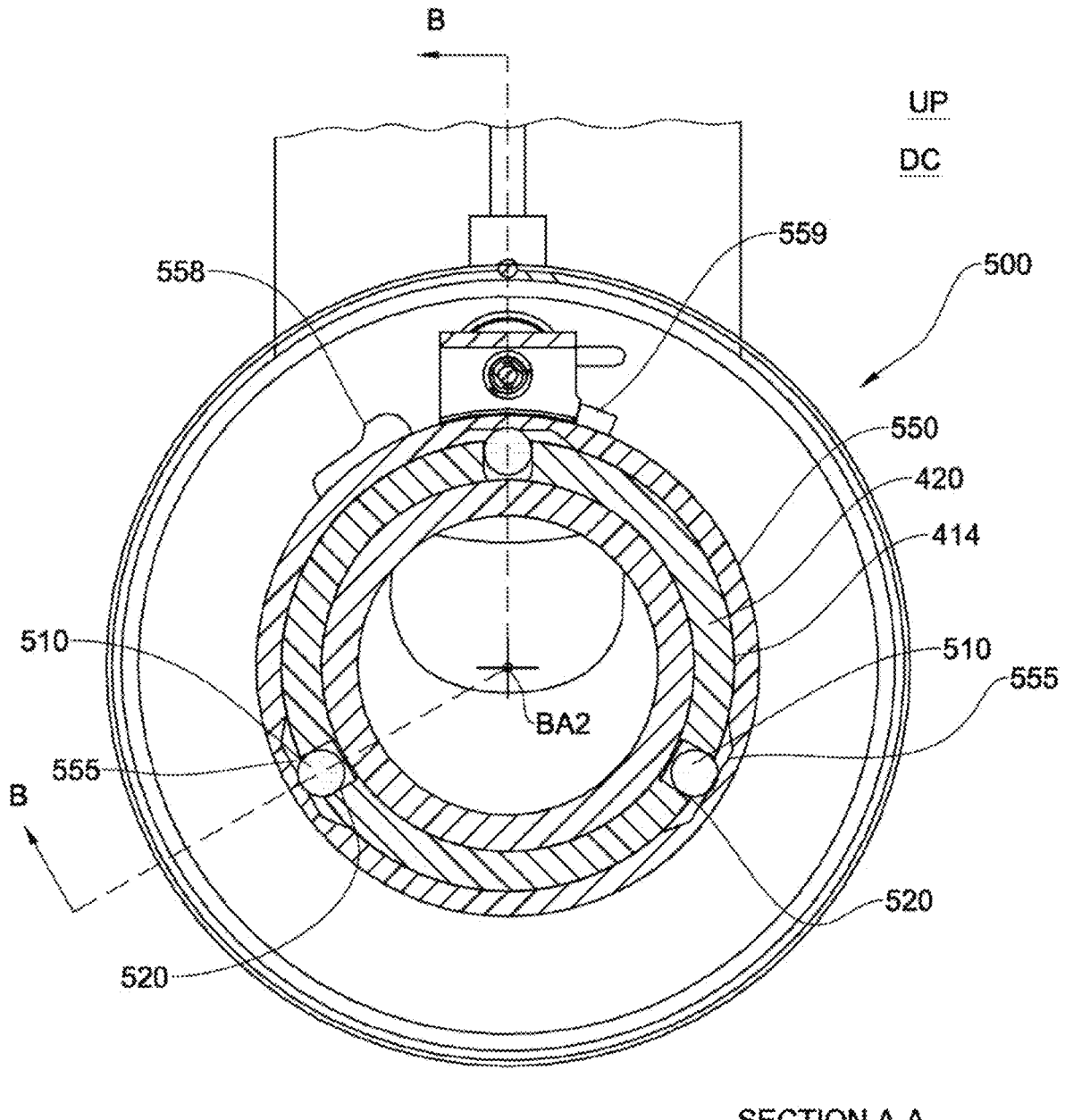
FIG. 6 is a longitudinal cross-sectional view of the example of FIG. 3 taken along A-A, in unlocking position.

Referring also to FIG. 5 and FIG. 6, the electrically actuable locking mechanism 500 is configured for selectively and reversibly locking together the first coupling element 410 with respect to the second coupling element 420 in the connected configuration CC when the electrically actuable locking mechanism 500 deactivated, and for selectively unlocking the first coupling element 410 with respect to the second coupling element 420 in the disconnected configuration DC when the electrically actuable locking mechanism 500 is electrically activated via the disconnection activation signal DAS.

The electrically actuable locking mechanism 500 comprises a plurality of locking elements. In at least this example, the elements are in the form of three balls 510, but in alternative variations of this example the locking elements can include a plurality of balls, for example more than three balls, or alternatively any other suitable locking elements.

The first cylindrical flange 415 comprises a plurality of ball chambers 520 in circumferentially arranged relationship therewith, i.e., with respect to the first boom axis BA1. Each ball chamber 520 is open at an outer radial part thereof, each ball chamber 520 is configured for accommodating one ball 510, and each ball chamber 520 comprises a through-opening 419 made through the first cylindrical flange from the ball chamber 520 to the first inner surface 416. Each through-opening 419 is shaped and sized such that, with a ball 510 accommodated in the respective ball chamber 520, part of the ball 510 is able to project out of the respective through-opening 419.

The electrically actuable locking mechanism 500 further comprises a collar 550 movably mounted with respect to the first cylindrical flange 415 and in overlying relationship with the first outer surface 414.

The collar 550 comprises a plurality of recesses 555 corresponding to the plurality of ball chambers 520 circumferentially arranged relationship therewith, i.e., with respect to the first boom axis BA1. Thus in at least this example the collar 550 comprises three recesses 555. The recesses 555 are radially spaced outwardly from the collar inner surface 551 with respect to the second boom axis BA2 by a collar recess spacing CRS. In at least this example, the recesses 555 are circumferentially spaced with respect to the collar 550, and furthermore also extend circumferentially, as best seen in FIG. 5 and FIG. 6.

In yet other alternative variations of this example the collar can be rotatably and axially mounted with respect to the first cylindrical flange 415, i.e., for allowing rotational and axial movement along the second boom axis BA2; for example, when these movements are concurrent, the collar 550 can move helically with respect to the first cylindrical flange 415. In such examples, the corresponding recesses can be spaced circumferentially from one another and extend helically, for example.

In at least this example, and referring in particular to FIG. 5, each ball 510 has a nominally identical respective ball diameter BD, and the first radial thickness t1 is less than each ball diameter BD, by an amount not less than collar recess spacing CRS. Thus, when each ball 510 is accommodated in the respective ball chamber 520 and radially aligned with the respective recess 555, the balls 510 do not project past the first inner surface 416 via the respective through-openings 419. On the other hand, when each ball 510 is accommodated in the respective ball chamber 520 and radially non-aligned with the respective recess 555, the balls 510 are in abutment with the collar inner surface 551 and thus project past the first inner surface 416 via the respective through-openings 419.

The collar 550 is movable between a locking position LP and an unlocking position UP. In at least this example, the collar 550 is exclusively rotatable (or pivotable) between the locking position LP and the unlocking position UP, about the second boom axis BA2. However, and as will become clearer herein, in alternative variations of this example, the collar can be exclusively translatable between the locking position LP and the unlocking position UP, for example in a direction parallel to the second boom axis BA2. In yet other alternative variations of this example, the collar can be rotatable and translatable between the locking position LP and the unlocking position UP, for example respectively about and in a direction parallel to the second boom axis BA2.

In at least this example, in the locking position LP, and referring in particular to FIG. 5, the recesses 555 are in circumferentially non-aligned with respect ball chambers 520, and in particular with the respective balls 510, and the collar 550 thus locks the balls 510 in a projecting position with respect to each respective through-opening 419.

In the unlocking position UP, and referring in particular to FIG. 6, the recesses 555 are in circumferential alignment with respect ball chambers 520, and in particular with the respective balls 510, and the collar 550 enables the balls 510 to recess into the respective ball chambers 520 and partially into the respective recesses 555, and thus enables the balls 510 to move away radially from the respective projecting positions.

Referring in particular to FIG. 5 and FIG. 7, the second cylindrical flange 425, in particular the second outer surface 424 thereof, comprises a plurality of locking grooves 429. The locking grooves 429 are in circumferentially arranged relationship with respect to the second outer surface 424, such that in the aforesaid locking position each ball 510 projects away from each respective through-opening 419 radially towards the second boom axis BA2 in a respective projecting position and into a locking configuration with a respective locking groove 429, such as to prevent relative movement (axial or rotational) between the first cylindrical flange 415 and the second cylindrical flange 425.

Figure 8:
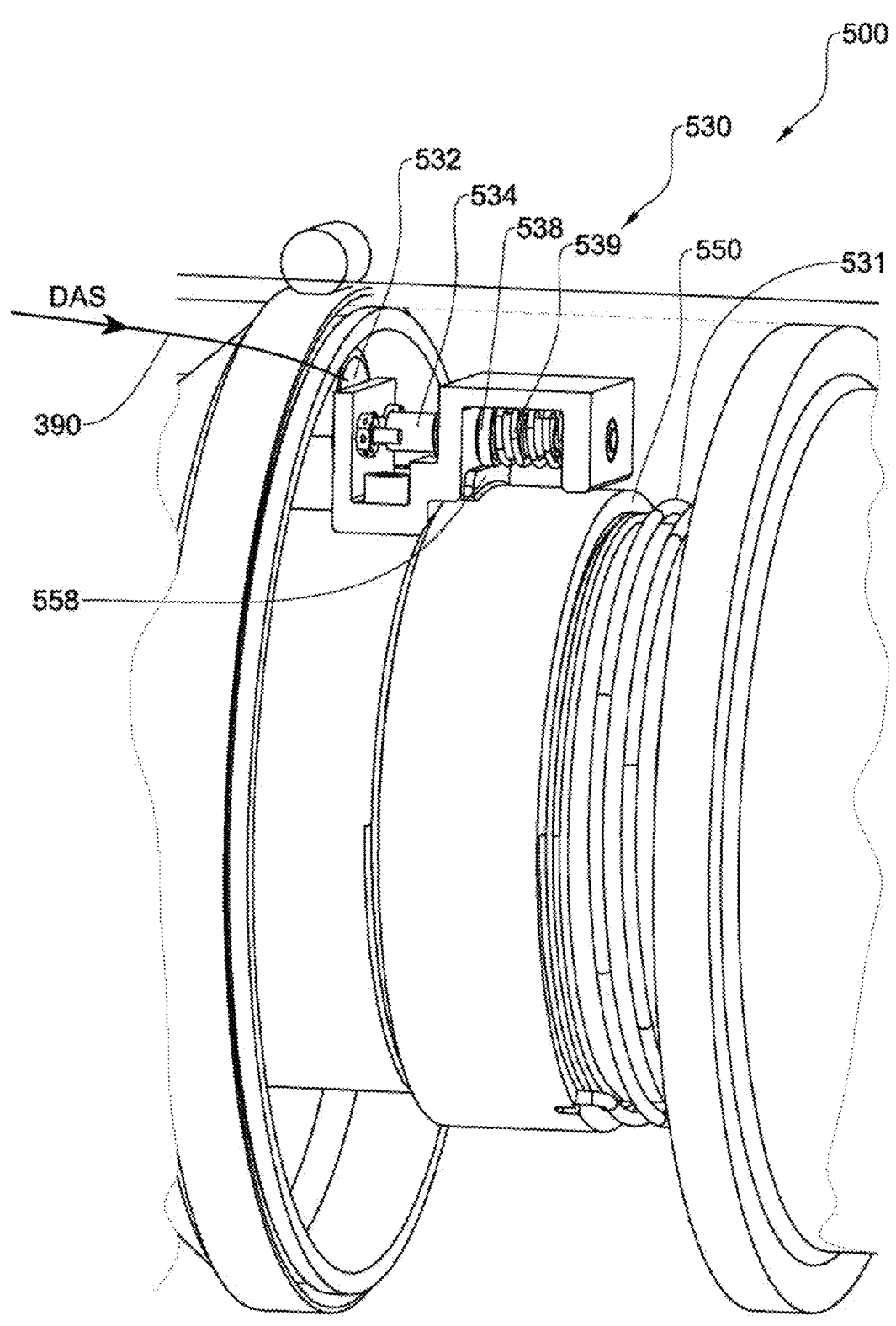
FIG. 8 is an isometric partial view of the solenoid arrangement of the example of FIG. 3.

Referring also to FIG. 8, the collar 550 comprises a mechanical stop 558 (also referred to interchangeably herein as a detent), and the electrically actuable locking mechanism 500 comprises a release solenoid arrangement 530. The release solenoid arrangement 530 is configured for selectively cooperating with the mechanical stop 558, such that in the absence of the aforesaid disconnection activation signal DAS the release solenoid arrangement 530 prevents movement of the collar 550 from the locking position, and such that in response to the disconnection activation signal DAS the release solenoid arrangement 530 allows movement of the collar 550 from the locking position LP to the unlocking position UP.

The release solenoid arrangement 530 comprises a solenoid 532 and a piston element 534 that is mounted for reciprocable movement with respect to the solenoid 532 between a first position, corresponding to the locking position LP, and a second position, corresponding to the unlocking position UP, responsive to the solenoid 532 being energized via the disconnection activation signal DAS.

The piston element 534 comprises a retaining pin 538 configured for selectively cooperating with the mechanical stop 558, and a biasing spring 539 configured for biasing the piston element 534 into the first position.

In at least this example, the collar 550 is biased into the unlocking position UP. For this purpose, the release solenoid arrangement 530 comprises a torsion spring 531 mounted at one longitudinal end thereof to the first cylindrical flange 415 and at another longitudinal end thereof to the collar 550. The torsion spring 531 is preloaded for biasing the collar 550 into the unlocking position UP.

In at least this example, the collar 550 comprises a final stop 559 configured for ensuring that the collar 550 stops rotating at the unlocking position UP after the release solenoid arrangement 530 is activated by the disconnection activation signal DAS.

As disclosed above, in at least this example the collar 550 is rotatably mounted with respect to the first cylindrical flange 415 about the second boom axis BA2. Furthermore, in at least this example the collar 550 is rotatable with respect to the first cylindrical flange 415 about the second boom axis BA2 between a first angular position, corresponding to the aforesaid locking position LP, and a second angular position, corresponding to the aforesaid unlocking position UP. For example, the angular displacement between the first angular position and the second angular position can be about 30°.

The connect/disconnect mechanism 300 further comprises a control line 390 operatively connecting the release solenoid arrangement 530 to a controller.

For example, the control line 390 can be in the form of an electrical cable, configured for selectively transmitting the disconnection activation signal DAS from the controller to the release solenoid arrangement 530, in particular to the solenoid 532. The disconnection activation signal DAS in such an example is an electrical current sufficient to energize the solenoid 532 sufficiently to cause the piston element 534 together with the retaining pin 538 to be axially moved to a position no longer abutting the mechanical stop 558, and thereby releasing the collar 550. In such an example the controller can be a human operator, for example, and the control line 390 comprises an electrical switch to enable selectively closing an electrical circuit to thereby energize the solenoid 532. In the absence of the retaining pin 538 being in abutting contact with the mechanical stop 558, the torsion spring 531 is free to rotate the collar 550 from the locking position LP to the unlocking position UP.

Thus, the connect/disconnect mechanism 300 can be assembled, and held in a preloaded position via the engaged retaining pin 538.

It is to be noted that in at least this example, the release solenoid arrangement 530 is in a normally unpowered configuration corresponding to the locking position LP, and the disconnection activation signal DAS powers the release solenoid arrangement 530 sufficiently to enable the electrically actuable locking mechanism 500 to transit to the unlocking position UP.

Alternatively, the control line 390 is also operatively connected to a communications module (not shown) configured for receiving a command signal from a controller, for example a human operator, and further configured for generating the disconnection activation signal DAS in the form of an electrical current sufficient for energizing the solenoid 532. The communication module can comprise, for example a controller, for example comprising a micro-computer or electronic circuitry, configured for receiving such a command signal and form generating the disconnection activation signal DAS in response to receiving the command signal. For example, such a command signal can be in the form of a digital or analog signal, and can be input directly into the communications module via wiring or via wireless connection.

In such cases, for example, the controller can be a human operator in the tanker aircraft 12.

It is to be noted that the connect/disconnect mechanism 300 is configured for supporting mechanical loads up to a maximum threshold load limit, at least in a direction parallel or co-axial with the second boom axis BA2, during refueling operations, in which the fuel delivery nozzle 135 is engaged with the receiver aircraft 20. For example, such a maximum threshold load limit can be more than ten times the magnitude of the nominal mechanical loads expected during standard in-flight refueling. For example, while in some examples such a nominal load can be about 200 lbf, the corresponding maximum threshold load limit can be for example 2700 lbf. In any case, if the maximum threshold load limit is exceeded, this will result in the first coupling element 410 being forcefully separated from the second coupling element 420, with the probability that parts of the connect/disconnect mechanism 300 becoming damaged in the process.

It is further to be noted that the connect/disconnect mechanism 300 enables emergency disconnection between the receiver aircraft and the refueling system, in which such disconnection can be carried out independently of the mechanical loads between the fuel delivery nozzle and the receiver aircraft.

It is further to be noted that the connect/disconnect mechanism 300 enables emergency disconnection between the receiver aircraft and the refueling system, in which such disconnection can be carried out under conditions wherein the mechanical loads between the fuel delivery nozzle and the receiver aircraft are in the order of nominal in-flight refueling loads. By "nominal in-flight refueling loads" is meant the magnitude of the nominal mechanical loads expected during standard in-flight refueling; for example, in some examples such a nominal in-flight refueling loads can be about 200 lbf.

Thus, while in this example the collar 550 is rotatably mounted with respect to the first cylindrical flange 415 about a reference axis, wherein such a reference axis is co-axial with the second boom axis BA2, in alternative variations of this example the collar can instead be mounted axially with respect to the first cylindrical flange, i.e., for allowing axial movement along the second boom axis BA2. In such examples, the corresponding recesses can be spaced circumferentially from one another and extend axially, for example.

Figures 9A, 9B:
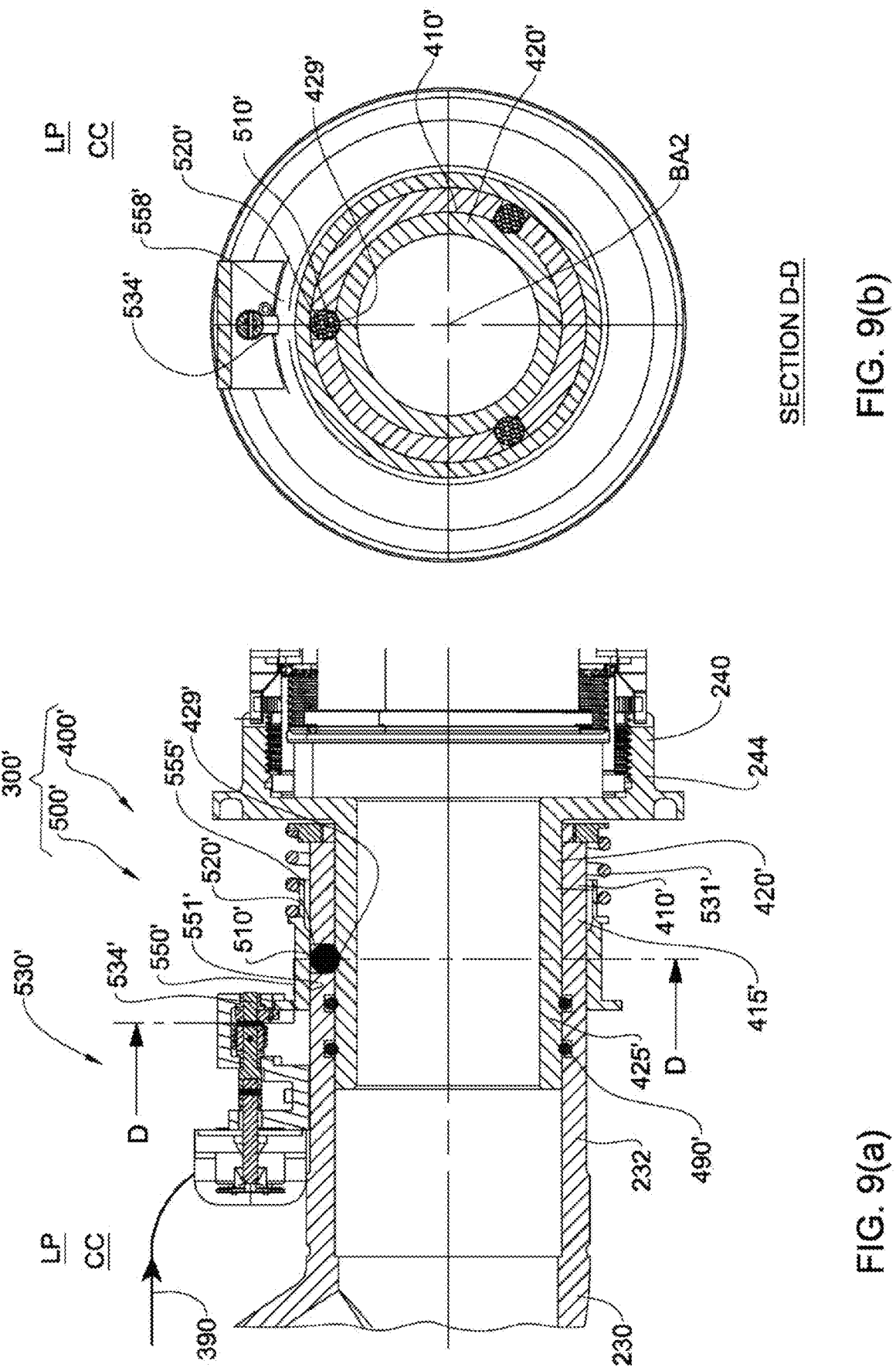
FIG. 9(*a*) is a transverse cross-sectional view of part of the boom member of an alternative variation of the example of FIG. 3, in locking position.

For example, and referring to FIGS. 9(*a*) to 12, in such an alternative variation of the example of FIG. 3, the respective connect/disconnect mechanism, generally designated with reference numeral 300' in these figures, comprises a corresponding mechanical coupling arrangement 400' and a corresponding electrically actuable locking mechanism 500'.

The mechanical coupling arrangement 400' comprises a first coupling element 410' affixed to the first boom element 230, and a second coupling element 420' affixed to the second boom element 240.

The first coupling element 410' is affixed to the first boom element 230 at an aft end 232 thereof, and the second coupling element 420' affixed to the second boom element 240 at a forward end 244 thereof.

The first coupling element 410' comprises a first cylindrical flange 415' and the second coupling element 420' comprises a second cylindrical flange 425'. In the connected configuration the first cylindrical flange 415' and the second cylindrical flange 425' are co-axial with respect to the second boom axis BA2, and in sealing engagement with respect to one another, for example via sealing rings 490'.

The first cylindrical flange 415' comprises a first outer surface 414' and a first inner surface 416', radially spaced from one another by a first flange thickness t1'.

The second cylindrical flange 425' comprises a second outer surface 424' and a second inner surface 426', radially spaced from one another by a second flange thickness t2'. The second inner surface 426' defines part of the second boom lumen 241.

The electrically actuable locking mechanism 500' is configured for selectively and reversibly locking together the first coupling element 410' with respect to the second coupling element 420' in the respective connected configuration CC when the respective electrically actuable locking mechanism 500' deactivated, and for selectively unlocking the first coupling element 410' with respect to the second coupling element 420' in the disconnected configuration DC when the electrically actuable locking mechanism 500' is electrically activated via the disconnection activation signal DAS carried by the control line 390.

The electrically actuable locking mechanism 500' comprises a plurality of locking elements. In at least this example, the elements are in the form of three balls 510', but in alternative variations of this example the locking elements can include a plurality of balls, for example more than three balls, or alternatively any other suitable locking elements.

The first cylindrical flange 415' comprises a plurality of ball chambers 520' in circumferentially arranged relationship therewith, i.e., with respect to the first boom axis BA1. Each ball chamber 520' is open at an outer radial part thereof, each ball chamber 520' is configured for accommodating one ball 510', and each ball chamber 520' comprises a through-opening 419' made through the first cylindrical flange from the ball chamber 520' to the first inner surface 416'. Each through-opening 419' is shaped and sized such that, with a ball 510' accommodated in the respective ball chamber 520', part of the ball 510' is able to project out of the respective through-opening 419'.

The electrically actuable locking mechanism 500' further comprises a collar 550' movably mounted with respect to the first cylindrical flange 415 and in overlying relationship with the first outer surface 414'. In particular, collar 550' is movable axially with respect to the first cylindrical flange 415', i.e., parallel to the first boom axis BA1.

The collar 550' comprises a plurality of recesses 555' corresponding to the plurality of ball chambers 520' circumferentially arranged relationship therewith, i.e., with respect to the first boom axis BA1. Thus in at least this example the collar 550 comprises three recesses 555'. The recesses 555' are radially spaced outwardly from the collar inner surface 551' with respect to the second boom axis BA2 by a collar recess spacing CRS'. In at least this example, the recesses 555' are circumferentially spaced with respect to the collar 550', and furthermore also extend axially, as best seen in FIG. 9(*a*) and FIG. 10(*a*).

Figures 10A, 10B:
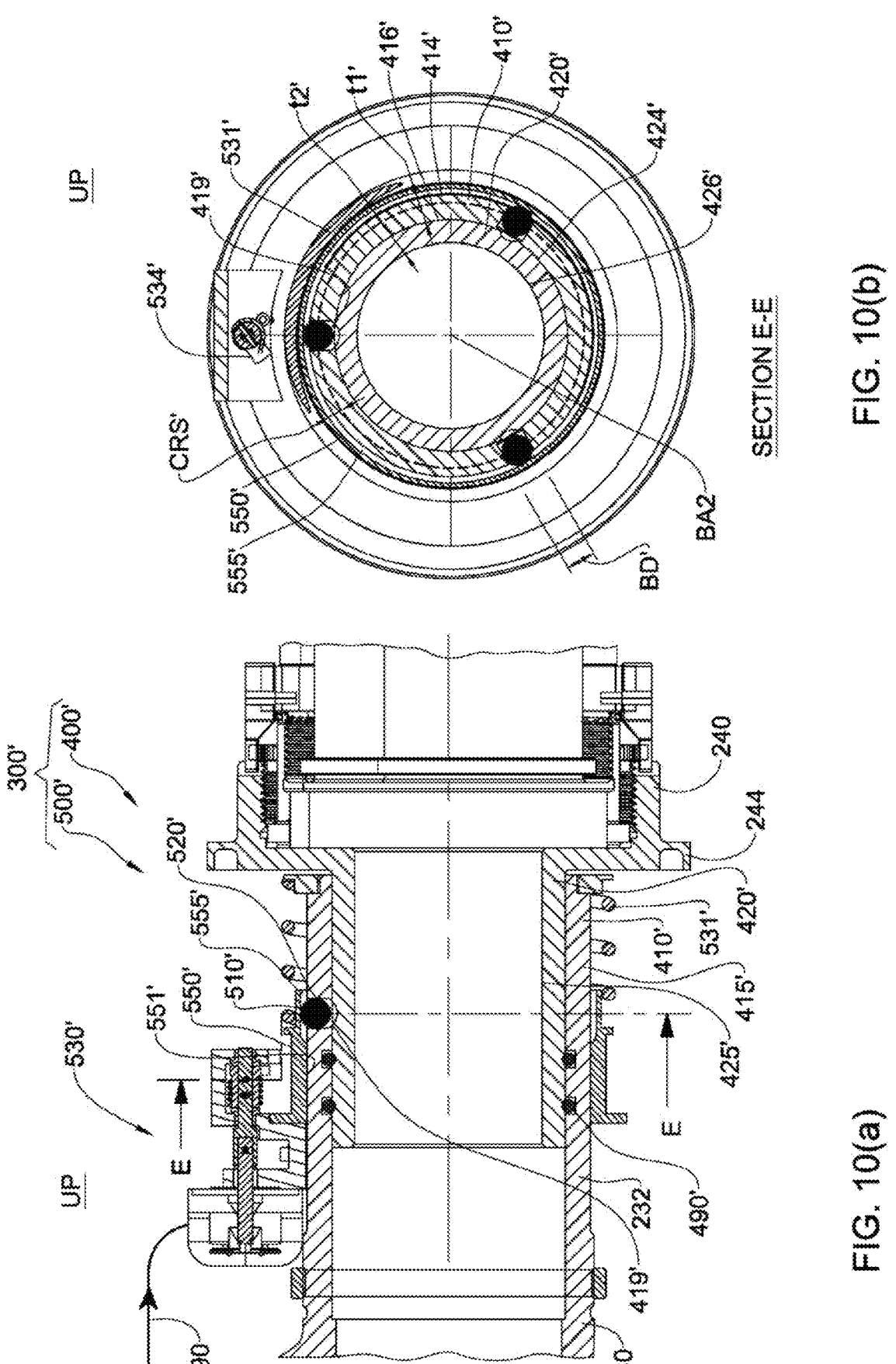
FIG. 10(*a*) is a transverse cross-sectional view of part of the boom member of an alternative variation of the example of FIG. 3, in unlocking position.

In at least this example, and referring in particular to FIG. 10(*b*), each ball 510' has a nominally identical respective ball diameter BD', and the first radial thickness t1' is less than each ball diameter BD', by an amount not less than collar recess spacing CRS'. Thus, when each ball 510' is accommodated in the respective ball chamber 520' and radially aligned with the respective recess 555', the balls 510' do not project past the first inner surface 416' via the respective through-openings 419'. On the other hand, when each ball 510' is accommodated in the respective ball chamber 520' and radially non-aligned with the respective recess 555', the balls 510' are in abutment with the collar inner surface 551' and thus project past the first inner surface 416' via the respective through-openings 419'. The collar 550' is movable between a locking position LP and an unlocking position UP. In at least this example, the collar 550' is exclusively translatable (i.e., not rotatable or pivotable) between the locking position LP and the unlocking position UP, about the second boom axis BA2.

In at least this example, in the locking position LP, and referring in particular to FIG. 9(*a*), the recesses 555' are in axially non-aligned with respect ball chambers 520', and in particular with the respective balls 510', and the collar 550' thus locks the balls 510' in a projecting position with respect to each respective through-opening 419'.

In the unlocking position UP, and referring in particular to FIG. 10(*a*), the recesses 555' are in axial alignment with respect ball chambers 520', and in particular with the respective balls 510', and the collar 550' enables the balls 510' to recess into the respective ball chambers 520' and partially into the respective recesses 555', and thus enables the balls 510' to move away radially from the respective projecting positions.

Referring in particular to FIG. 9(*a*) and FIG. 9(*b*), the second cylindrical flange 425', in particular the second outer surface 424' thereof, comprises a plurality of locking grooves 429'. The locking grooves 429' are in circumferentially arranged relationship with respect to the second outer surface 424', such that in the aforesaid locking position each ball 510' projects away from each respective through-opening 419' radially towards the second boom axis BA2 in a respective projecting position and into a locking configuration with a respective locking groove 429', such as to prevent relative movement (axial or rotational) between the first cylindrical flange 415' and the second cylindrical flange 425'.

Figure 11:
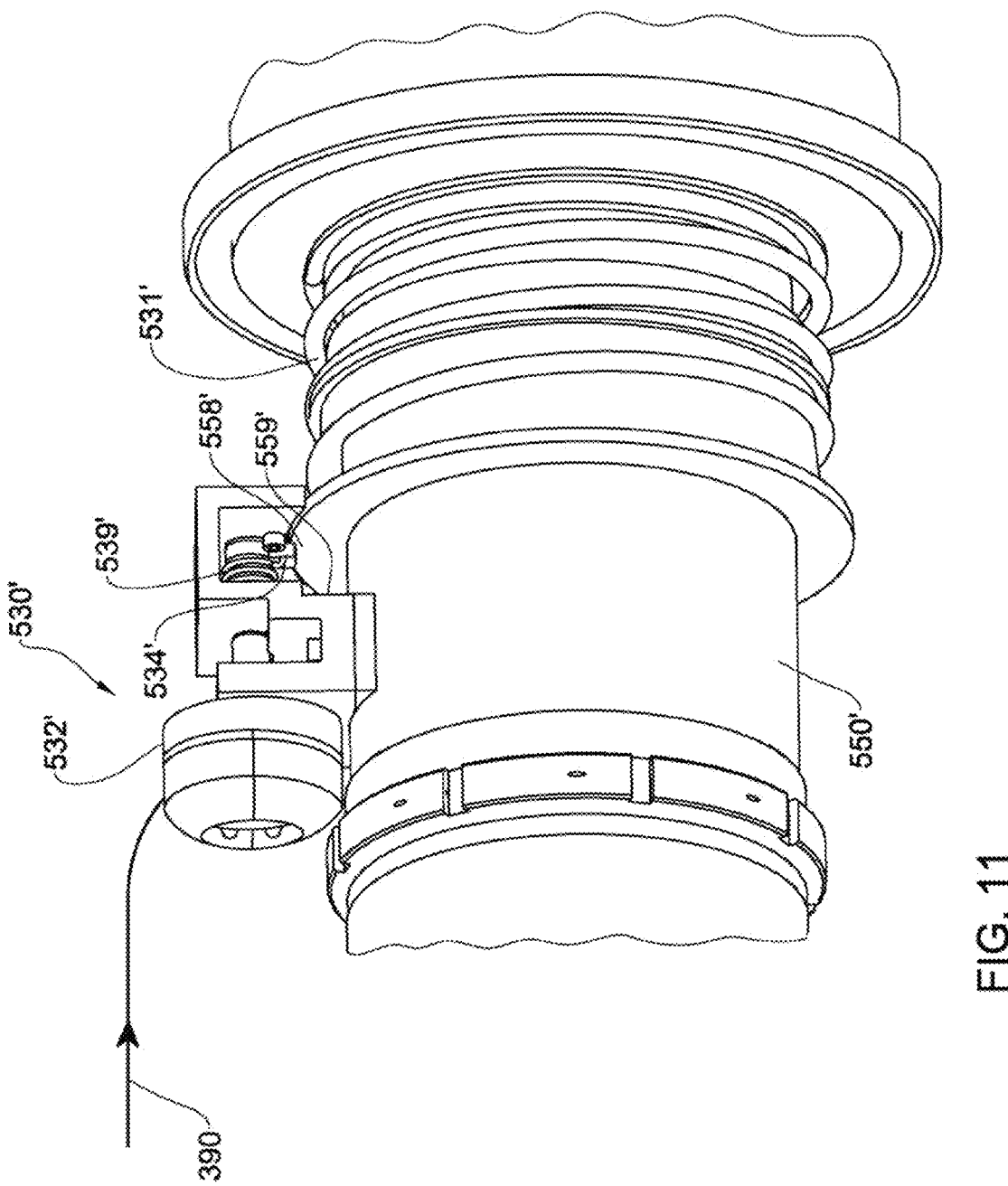
FIG. 11 is an isometric partial view of the solenoid arrangement of the example of FIG. 9(*a*) and FIG. 9(*b*), in locking position.
Figure 12:
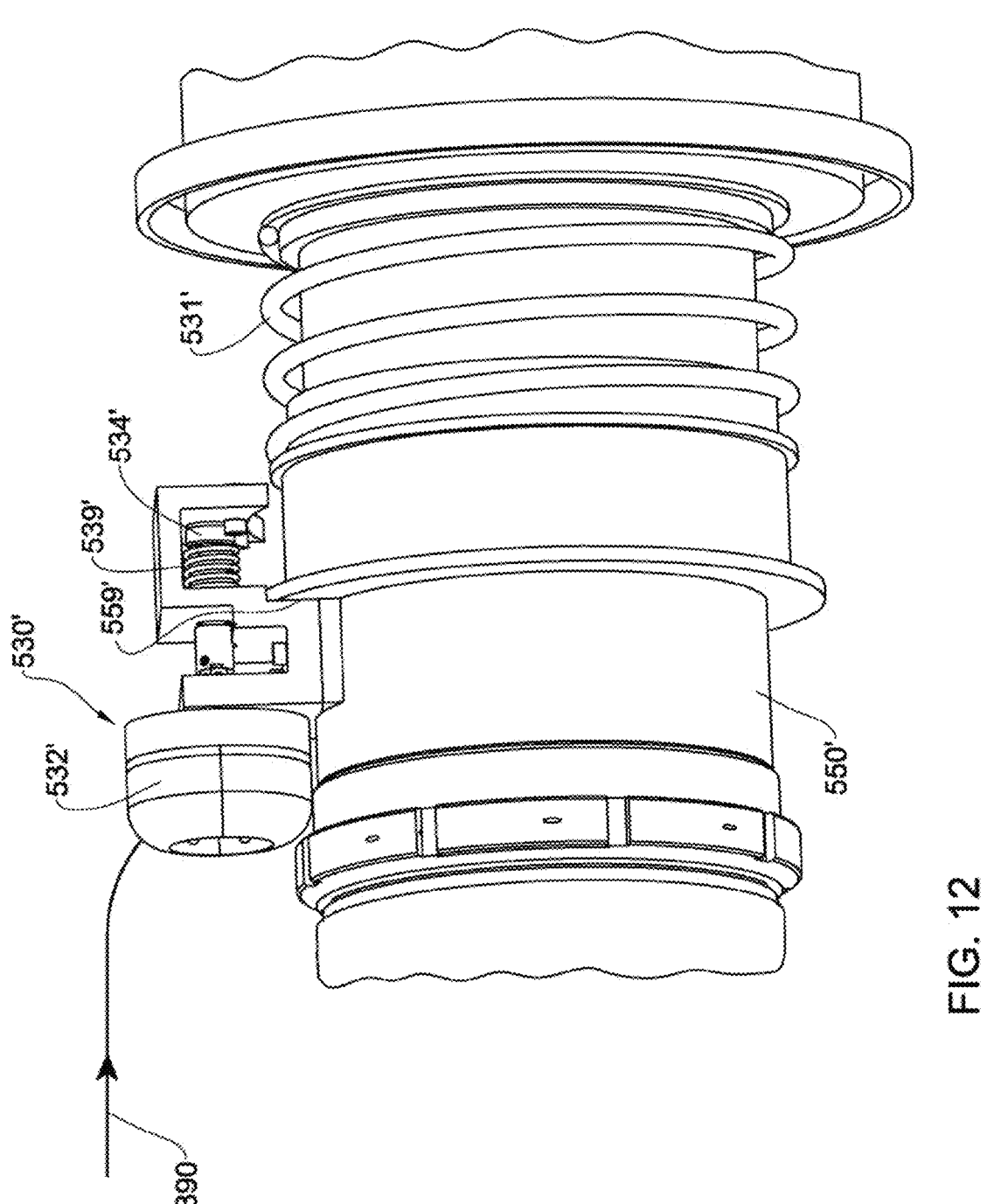
FIG. 12 is an isometric partial view of the solenoid arrangement of the example of FIG. 10(*a*) and FIG. 10(*b*), in unlocking position.

Referring in particular to FIG. 9(*b*), FIG. 10(*b*), FIG. 11 and FIG. 12, the collar 550' comprises a mechanical stop 558' (also referred to interchangeably herein as a detent), and the electrically actuable locking mechanism 500' comprises a release solenoid arrangement 530'. The release solenoid arrangement 530' is configured for selectively cooperating with the mechanical stop 558', such that in the absence of the aforesaid disconnection activation signal DAS the release solenoid arrangement 530' prevents movement of the collar 550' from the locking position, and such that in response to the disconnection activation signal DAS the release solenoid arrangement 530' allows movement of the collar 550' from the locking position LP to the unlocking position UP.

The release solenoid arrangement 530' comprises a solenoid 532' and an arm element 534' that is mounted for pivotal movement with respect to the solenoid 532' between a first position, corresponding to the locking position LP, and a second position, corresponding to the unlocking position UP, responsive to the solenoid 532' being energized via the disconnection activation signal DAS.

The arm element 534' is configured for selectively cooperating with the mechanical stop 558', and a biasing spring 539' configured for biasing the arm element 534' into the first position.

In at least this example, the collar 550' is biased into the unlocking position UP. For this purpose, the release solenoid arrangement 530' comprises a linear spring 531' mounted at one longitudinal end thereof to the first cylindrical flange 415' and at another longitudinal end thereof to the collar 550'. The linear spring 531' is preloaded for axially biasing the collar 550' into the unlocking position UP.

In at least this example, the collar 550' comprises a final axial stop 559' configured for ensuring that the collar 550' stops axial translation at the unlocking position UP after the release solenoid arrangement 530' is activated by the disconnection activation signal DAS.

Thus, in this example in which the collar is mounted with respect to the first cylindrical flange along a reference axis (for example wherein said reference axis is co-axial with said second boom axis), the collar 550' is axially movable with respect to the first cylindrical flange 415' about the second boom axis BA2 between a first axial position (FIG. 9(*a*)) corresponding to the locking position LP, and a second axial position (FIG. 10(*a*)) corresponding to the unlocking position UP.

Also in at least this example, the connect/disconnect mechanism 300' further comprises a control line 390' operatively connecting the release solenoid arrangement 530' to a controller.

For example, the control line 390' can be in the form of an electrical cable, configured for selectively transmitting the disconnection activation signal DAS from the controller to the release solenoid arrangement 530', in particular to the solenoid 532'. The disconnection activation signal DAS in such an example is an electrical current sufficient to energize the solenoid 532' sufficiently to apply a resisting torque to the arm element 534', to thereby cause the arm element 534' to be pivoted to a circumferential position no longer abutting the mechanical stop 558', and thereby releasing the collar 550'. In such an example the controller can be a human operator, for example, and the control line 390' comprises an electrical switch to enable selectively closing an electrical circuit to thereby energize the solenoid 532'. In the absence of the arm element 534' being in abutting contact with the mechanical stop 558', the linear spring 531' is free to axially push the collar 550' along the first boom axis BA1 from the locking position LP to the unlocking position UP.

Thus, the connect/disconnect mechanism 300' can be assembled, and held in a preloaded position via the engaged arm element 534'.

It is to be noted that in at least this example, the release solenoid arrangement 530' is in a normally unpowered configuration corresponding to the locking position LP, and the disconnection activation signal DAS powers the release solenoid arrangement 530' sufficiently to enable the electrically actuable locking mechanism 500' to transit to the unlocking position UP.

Alternatively, the control line 390' is also operatively connected to a communications module (not shown) configured for receiving a command signal from a controller, for example a human operator, and further configured for generating the disconnection activation signal DAS in the form of an electrical current sufficient for energizing the solenoid 532'. The communication module can comprise, for example a controller, for example comprising a micro-computer or electronic circuitry, configured for receiving such a command signal and form generating the disconnection activation signal DAS in response to receiving the command signal. For example, such a command signal can be in the form of a digital or analog signal, and can be input directly into the communications module via wiring or via wireless connection.

In such cases, for example, the controller can be a human operator, for example in the tanker aircraft 12.

It is to be noted that the connect/disconnect mechanism 300' is configured for supporting mechanical loads up to a maximum threshold load limit, at least in a direction parallel or co-axial with the second boom axis BA2, during refueling operations, in which the fuel delivery nozzle 135 is engaged with the receiver aircraft 20. For example, such a maximum threshold load limit can be more than ten times the magnitude of the nominal mechanical loads expected during standard in-flight refueling. For example, while in some examples such a nominal load can be about 200 lbf, the corresponding maximum threshold load limit can be for example 2700 lbf. In any case, if the maximum threshold load limit is exceeded, this will result in the first coupling element 410' being forcefully separated from the second coupling element 420', with the probability that parts of the connect/disconnect mechanism 300' becoming damaged in the process.

It is further to be noted that the connect/disconnect mechanism 300' enables emergency disconnection between the receiver aircraft and the refueling system, in which such disconnection can be carried out independently of the mechanical loads between the fuel delivery nozzle and the receiver aircraft.

It is further to be noted that the connect/disconnect mechanism 300' enables emergency disconnection between the receiver aircraft and the refueling system, in which such disconnection can be carried out under conditions wherein the mechanical loads between the fuel delivery nozzle and the receiver aircraft are in the order of nominal in-flight refueling loads. By "nominal in-flight refueling loads" is meant the magnitude of the nominal mechanical loads expected during standard in-flight refueling; for example, in some examples such a nominal in-flight refueling loads can be about 200 lbf.

In yet other alternative variations of the above examples, and in which the collar is axially and rotatably mounted with respect to the first cylindrical flange 415 with respect to a reference axis (for example wherein said reference axis is co-axial with said second boom axis BA2), the collar 550 is axially and rotatably movable with respect to the first cylindrical flange 415 with respect to the second boom axis BA2 between a first axial/angular position corresponding to the locking position LP and a second axial/angular position corresponding to the unlocking position UP.

The refueling device 100 further comprises an electrical harness 199 (see for example FIG. 4 and FIG. 7), for controlling operation of the fuel delivery nozzle 135, and is operatively connected to the second boom member portion 240. The electrical harness 199 in at least this example also incorporates the respective control line 390 or the respective control line 390' for controlling operation of the respective connect/disconnect mechanism 300' or the respective connect/disconnect mechanism 300' (via the release solenoid arrangement 530').

Referring again to FIG. 2, a tanker system 10, according to one example of the presently disclosed subject matter, comprises the tanker aircraft 12 including one or more in-flight refueling systems 50. As will become clearer herein, each refueling system 50 comprises a refueling device 100.

In at least this example, the tanker aircraft 12 has three such in-flight refueling systems 50, one in-flight refueling system 50 carried by the port wing 14, another in-flight refueling system 50 carried by the starboard wing, and a third in-flight refueling system 50 located in the rear portion of the fuselage 15, and the tanker aircraft 12 is configured for in-flight concurrent refueling of up to three receiver aircraft 20. Thus, in at least this example, one in-flight refueling system 50 is centrally-located and mounted with respect to the rear fuselage of the tanker aircraft 12, and each of the other two in-flight refueling systems 50 is comprised in a respective pod 51 that is attached to the underside of the respective wing. In alternative variations of this example the tanker aircraft 12 can have at least one, or two, or more than three in-flight refueling systems 50, arranged in any suitable configuration with respect to the tanker aircraft 12.

By way of non-limiting example, such a tanker aircraft 12 can be a suitably equipped Boeing 767, Boeing 747, or Airbus 330, and each receiver aircraft 20 can include any suitable aircraft, for example any one of suitably equipped F-15, or F-16, or F-35, or B1, or B2 stealth bomber, or other suitably equipped fighter, bomber or other aircraft. Alternatively, and also by way of non-limiting example, the tanker aircraft can be an unmanned aerial vehicle (UAV), and/or at least one of the receiver aircraft can be a UAV.

Also by way of non-limiting example, a refueling flight envelope for use with such a tanker system 10 can include a forward speed of between about 220 knots and about 320 knots (typically about 280 knots), and an altitude of between 500 ft and between about 30,000 ft to about 40,000 ft, and in general typically not below about 10,000 ft, in which refueling can take place between the tanker aircraft 12 and each receiver aircraft 20, flying in formation, depending on the operating limits of the tanker aircraft and of the receiver aircraft, as well as other factors.

In at least this example, and referring again to FIGS. 1(a) and 1(b), each in-flight refueling system 50 comprises an elongate, non-rigid, fuel delivery hose 52, reversibly extendible from the tanker aircraft 12. A first end (not shown) of the hose 52 is connected to a refueling fuel tank (not shown) carried by the tanker aircraft 12. For example, such a refueling fuel tank can be an internal fuel tank of the tanker aircraft 12, for example the tanker aircraft's own fuel tanks, or a special fuel reservoir mounted internally in the tanker aircraft 12, for example in the fuselage, or externally (for example carried in fuel pods).

The hose 52 is flexible and can be retracted into a roll up drum (not shown), suitably provided in the tanker aircraft 12, and selectively deployed therefrom when required.

The second (aft) end 54 of hose 52 is operatively connected to a respective refueling device 100 that is towed in a forward direction A by the tanker aircraft 12 via hose 52 when the hose 52 is extended and the tanker aircraft 12 is in flight.

Thus, and referring again to FIGS. 1(a) and 1(b), the refueling device according to a first example of the presently disclosed subject matter, generally designated 100, is configured for use with respect to an in-flight refueling system, for example at least one of the in-flight refueling systems 50 of the example of the tanker system 10 illustrated FIG. 2.

Refueling device 100 is affixed to the end 54 of hose 52 and comprises body 110, which at least in this example is in the form of a generally elongate fuselage, and comprises longitudinal axis LAB. While in at least this example the body 110 comprises a general oval or elliptical cross section, in alternative variations of this example the body 110 can have any other suitable cross-sectional shape, for example circular cross-section, polygonal cross-section, super-elliptical cross-section, and so on.

The body 110 comprises a fuel delivery lumen 120 and carries boom member 130 in fluid communication with fuel delivery lumen 120.

The body 110 comprises a coupling 140 at forward end 114 thereof. The coupling 140 comprises a hose interface configured for connecting the lumen 120 to the hose 52, and thereby to the tanker aircraft 12. The coupling 140 can be configured for allowing relative rotation between the body 110 and the hose 52 while maintaining fluid communication between the lumen 120 and the hose 52 and thus the refueling tank. In this example, the coupling 140 is in the form of a universal joint or the like (also referred to as a universal coupling, a Cardan joint, a Hardy-Spicer joint or a Hooke's joint, and so on), and is thus configured for allowing relative rotation between the body 110 and the hose 52 in three degrees of freedom.

In alternative variations of this example and in other examples, the coupling can instead be configured for allowing relative rotation between the body 110 and the hose 52 in one degree of freedom, or in two degrees of freedom. In yet other alternative variations of this example the coupling 140 can be omitted and replaced with a fixed coupling that is configured to maintain a fixed relative spatial disposition between the body 110 and the hose 52.

Referring again to FIG. 1(a), the body 110 has a neutral point NP. In at least this example, at least during refueling operation the fuel delivery nozzle 135 is longitudinally forward of the neutral point NP by a longitudinal spacing LS. As is well known in the art the neutral point of an air vehicle is the position at which the center of gravity needs to be located to provide the aircraft with neutral stability. In practice conventionally, the center of gravity of many conventional air vehicles is often not located at the neutral point, and the distance between the two is referred to as the static margin. The static margin is "positive" if the center of gravity is located forward of the neutral point, providing the aircraft with positive stability, or "negative" if the center of gravity is located aft of the neutral point, providing the aircraft with negative stability. In at least this example, the device 100 is configured with positive stability, and the neutral point NP thereof is located aft of the center of gravity CG.

It is also to be noted that in practice, the fuel delivery nozzle 135 is spaced below the underside 115 of the body 110 by a transverse spacing to provide sufficient clearance with respect to the receiver aircraft 20, and thereby minimize risk of collision between the receiver aircraft 20 and the body 110.

While in at least this example, the boom member 130 is configured as an elbowed boom, in alternative variations of this example the boom member 130 is configured as a rectilinear boom or as a curved boom.

Figure 1A:
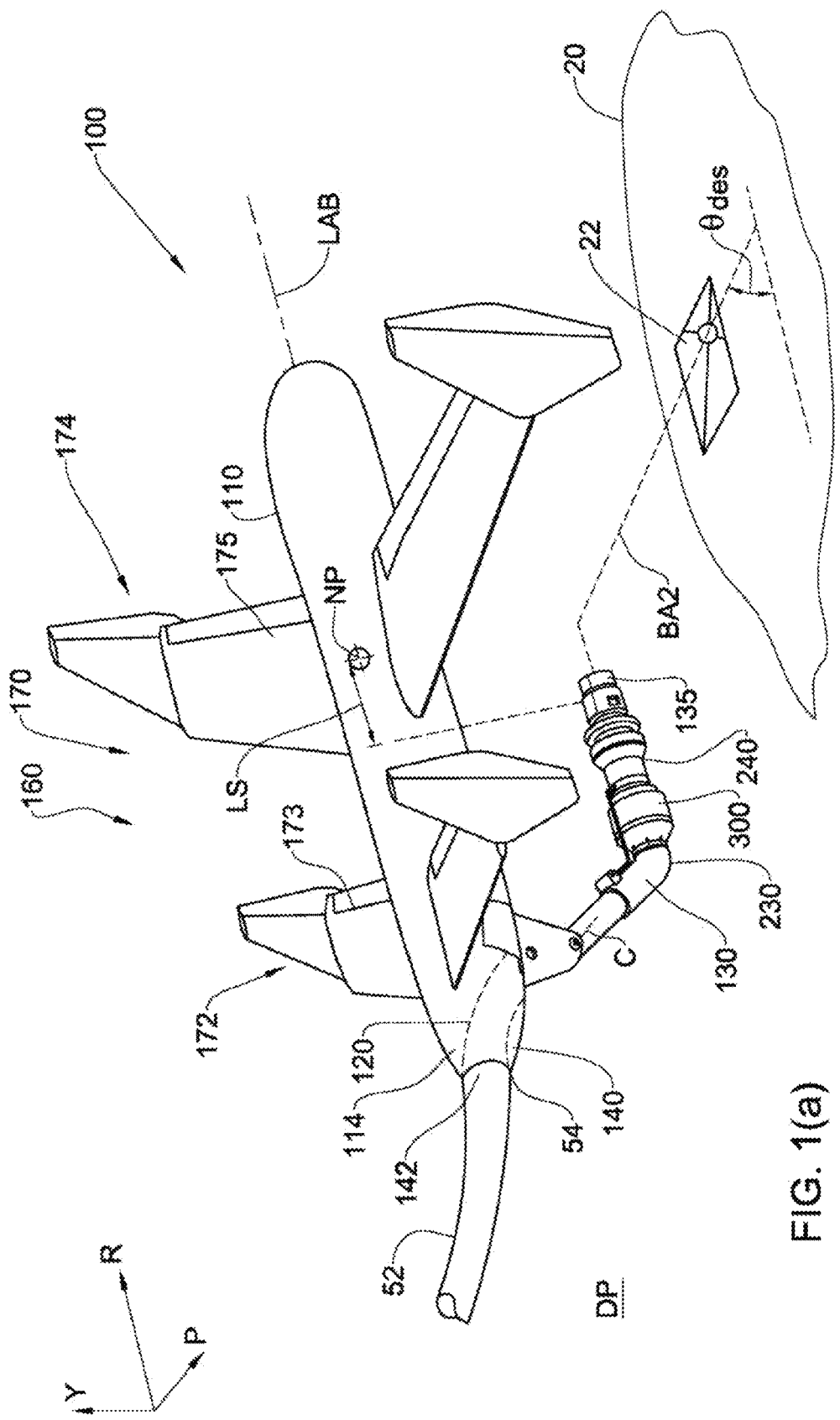
FIG. 1(*a*) is a front-top isometric view of a refueling device according to of an example of the presently disclosed subject matter, with the boom member in the deployed position.
Figure 1B:
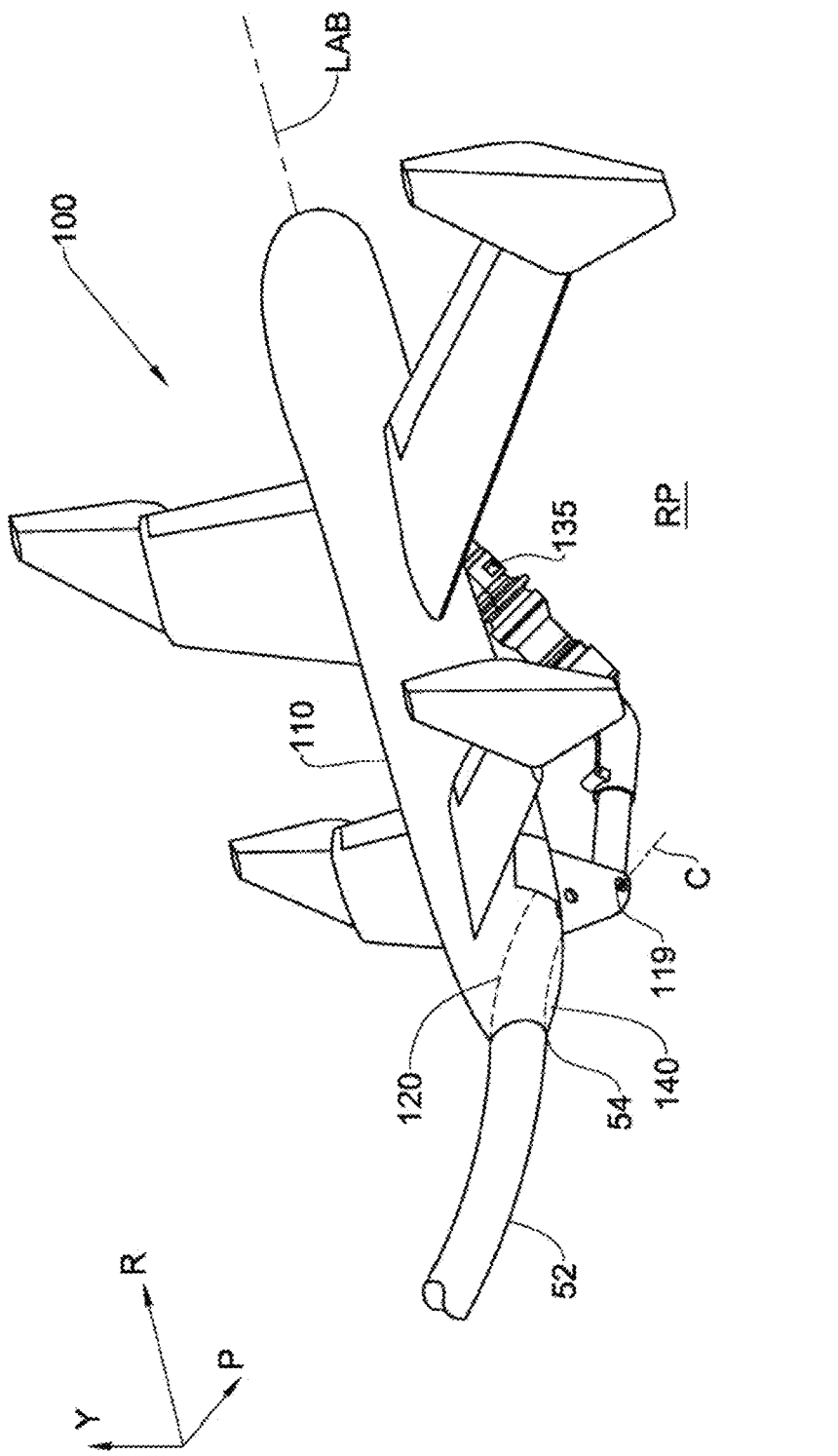

In the stowed or boom retracted position (FIG. 1(b)), boom member 130 is pivoted about axis C into a position where the fuel delivery nozzle 135 is closest to the lower side of body 110. In the boom deployed position, boom member 130 is variably pivoted about pivot axis C in a downward direction to provide a desired orientation with respect to the fuel receptacle of the receiver aircraft 20.

In any case, in general the boom member 130 is in the boom deployed position DP at least during in-flight refueling operation of the device 100.

A suitable actuation mechanism (not shown) is provided for controllably pivoting the boom member 130 between the stowed or boom retracted position RP and the boom deployed position DP.

The refueling device 100, in particular the boom member 130, nozzle 135 and lumen 120 can be sized to allow suitable fuel flow rates for refueling a wide range of receiver aircraft. By way of non-limiting example, relative high fuel flow rates (for example up to 1000 US gallons/6,500 lb. per minute) can be provided for refueling operations of large aircraft (for example transport aircraft, bombers, etc.), while for fighter aircraft that cannot accept fuel at the maximum flow rate of the refueling device 100, the refueling pressure can be correspondingly reduced. Alternatively, the refueling device 100, in particular the boom member 130, nozzle 135, lumen 131 and lumen 120 can be sized to allow suitable fuel flow rates for refueling a narrow range of receiver aircraft, for example only fighter aircraft or only larger aircraft (for example about 400 US gallons/2,600 lb. per minute).

The spatial control system 160 is configured for controlling a spatial disposition of the refueling device 100 when towed aft of the tanker aircraft 12 via the hose 52, and enables the refueling device 100 to be steered and/or to adopt any desired stable spatial disposition while being towed at the end 54 of hose 52.

In particular, and referring to FIG. 1(a), spatial control system 160 is configured for selectively and controllably providing a non-zero angular disposition, between the second boom axis BA2 of the boom member 130 and the forward direction A, and enables this angular disposition to be selectively maintained between the second boom axis BA2 and the forward direction A at least for a part of the time when the refueling device 100 is being towed by the tanker aircraft 12 via hose 52, in particular during the engagement operation of the fuel device 100 to the receiver aircraft 20 and during refueling thereof.

The spatial control system 160 is also configured for providing stability to the refueling device 100, while tethered to and towed by the tanker aircraft 12 via the hose 52, and while the second boom axis BA2 is at any desired pitch and/or yaw and/or roll angle to provide the aforesaid angular disposition.

In particular, this angular disposition is such as to provide a design angle $\theta_{des}$ that is within a particular angular range which corresponds to the design relative angular position of the boom member 130 (in particular the design relative angular position of the second boom axis BA2) with respect to the receiver aircraft 20. Thus, at the design angle the second boom axis BA2 is in an engagement enabling orientation with respect to the receiver aircraft 20, and in particular with respect to the fuel receptacle 22.

In at least one non-limiting example, the design angle can be about 30°, and operation of the refueling device 100 to adopt this angle automatically renders it compatible for use with existing receiver aircraft 20, in which the fuel receptacles 22 are configured for receiving and engaging with a nozzle at the end of a boom where the boom is at about 30° to the longitudinal axis of the receiver aircraft, without the need for modifying the configuration of the fuel receptacle thereof.

In at least this example, the spatial control system 160 comprises a selectively controllable aerodynamic control system 170, comprising a forward set 172 of aerodynamic control surfaces 173 mounted to body 110 at a forward portion thereof, and an aft set 174 of aerodynamic control surfaces 175 mounted to the body 110 at an aft portion thereof. The aft set 174 is thus in aft spaced relationship with respect to the forward set 172, and the center of gravity CG of the body 110 is disposed longitudinally intermediate the aft set 174 and the forward set 172, noting that the actual longitudinal position of the center of gravity CG can shift between two extreme longitudinal positions according to, inter alia, whether the boom member 135 is extended or retracted, and whether fuel is present in the refueling device 100 or absent therefrom.

It is to be noted that at least in this example, the center of gravity CG is forward of the neutral point NP.

In at least this example, the forward set 172 of aerodynamic control surfaces 173 is in the form of a H-canard arrangement at a forward part of the body 110, and similarly the aft set 174 of control surfaces 175 is in the form of a H-tail arrangement. However, other arrangements are also possible for selectively controllable aerodynamic control system 170 and/or for the body 110. Alternatively, for example the forward set 172 of aerodynamic control surfaces 173 and/or the aft set 174 of aerodynamic control surfaces 175 can optionally be blended with the body 100 to provide a blended body configuration. In yet other alternative variations of this example, for example, one of the forward set 172 of aerodynamic control surfaces 173 and/or the aft set 174 of aerodynamic control surfaces 175 can be omitted, and the other one of forward set 172 of aerodynamic control surfaces 173 and/or the aft set 174 of aerodynamic control surfaces 175 can be formed as a flying wing configuration, incorporating therein the functions of body 110, which can then be omitted. In yet other alternative variations of this example, for example, the forward set 172 of aerodynamic control surfaces 173 and/or the aft set 174 of aerodynamic control surfaces 175 can both be omitted, and the body 110 can be formed as a lifting body, integrally providing the functions of the aerodynamic control system 170. In yet other alternative variations of this example, for example, the aerodynamic control system 170 can be replaced with or supplemented by reaction control thrusters.

Optionally, the device 100 can comprises a longitudinal displacement control system 200 (FIG. 2), different from the spatial control system 160, which can be operated to selectively provide longitudinal displacements to the refueling device 100, and/or can be operated as an aerodynamic stabilizer arrangement.

Further optionally, the device 100 can comprises a force generating arrangement (not shown) configured for selectively generating a force along said second boom axis in a direction towards said fuel delivery nozzle. For example, such a force generating arrangement is configured for selectively generating said force along the second boom axis BA2 in a direction towards the fuel delivery nozzle 135 responsive to the fuel delivery nozzle 135 being in predetermined proximity to the fuel receptacle 22 of the receiver aircraft 20 wherein to force the fuel delivery nozzle 135 into engagement with the fuel receptacle 22.

Further optionally, the refueling device 100 further comprises a data acquisition system (not shown) configured for providing spatial data relating to a relative spatial disposition between the fuel delivery nozzle 135 and the fuel receptacle 22, to enable selectively controlling the refueling device 100 to provide automatic or autonomous or manual engagement of the fuel delivery nozzle 135 to the fuel receptacle 22 of the receiver aircraft 20.

Further optionally, the refueling device 100 further comprises a suitable device controller (not shown) for controlling operation of the refueling device 100. For example such a device controller can be in the form of a suitable computer or computing device.

The boom member 130, the refueling device 100, and the tanker system 10 can be used for example as follows, according to aspects of the presently disclosed subject matter.

With the tanker system 10 airborne, one refueling device is deployed aft of the tanker aircraft and towed via the hose 52.

The receiver aircraft 12 approaches the deployed refueling device 100 and the fuel delivery nozzle 135 is engaged with respect to the receiver aircraft, enabling in-flight refueling to proceed in the normal manner. For example, the fuel delivery nozzle 135 and fuel receptacle 22 are engaged and locked via locking latches, which are typically provided in the receiver aircraft 20.

When refueling is complete, or when the pilot of the receiver aircraft 20 otherwise wishes to disengage from the refueling device 100, release of the locking latches is commanded via an electrical signal. The electrical command signal can come from the refueling device 100 itself in an automated manner (for example responsive to determining directly or indirectly that the receiver aircraft fuel tanks are full, or after a predetermined time after commencement of fuel flow to the receiver aircraft). Alternatively, electrical command signal can come from the operator of the refueling system of the tanker system 10. Alternatively, electrical command signal can come from the pilot of the receiver aircraft 20.

In normative situations, at the end of refueling the fuel delivery nozzle disengages from the refueling device 100, which is then retracted by the tanker aircraft.

In certain circumstances there can arise a nozzle disconnect failure, in which it is not possible to disconnect the fuel delivery nozzle 135 from the receiver aircraft 20. For example, a mechanical jam can occur preventing disengagement, or there is an electrical command malfunction that prevents the fuel delivery nozzle 135 from being released from the fuel receptacle.

In such a nozzle disconnect failure situation, a potentially catastrophic flight condition can be created since, in the absence of the presently disclosed subject matter, the receiver aircraft is now permanently mechanically connected to the delivery system 10 via the trapped fuel delivery nozzle 135.

On the other hand, and according to an aspect of the presently disclosed subject matter, the operator in the refueling system 10 can, in such circumstances selectively provide the disconnection activation signal DAS to the boom member 130, in particular to the connect/disconnect mechanism 300, to thereby disconnect the first boom member portion 230 with respect to the second boom member portion 240 to thereby provide the disconnected configuration, in which the fuel delivery nozzle together with the second boom member 240 remain engaged with the receiver aircraft, but are now disconnected from the remainder of the boom element 130 and the fuel system 10.

Alternatively, the disconnection activation signal DAS can be provided to the boom member 130, in particular to the respective connect/disconnect mechanism 300 or to the respective connect/disconnect mechanism 300', via a separate channel. For example, such a separate channel can be via the receiver aircraft pilot, ground station, and so on.

In this manner, the receiving aircraft is no longer mechanically connected to the refueling system 10, and is thus allowed to separate from the respective refueling device 10 while said delivery nozzle is engaged to the receiver aircraft.

The refueling process is terminated with disconnection of the respective connect/disconnect mechanism 300 or the respective connect/disconnect mechanism 300, and the refueling device 100 can be stowed back into the tanker aircraft.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A boom member configured for enabling in-flight refueling of a receiver aircraft, the boom member, comprising:

a first boom member portion;

a second boom member portion; and a connect/disconnect mechanism;

wherein the first boom member portion includes a first boom lumen, a first boom axis, and a fuel receiving end, the fuel receiving end configured for receiving fuel from a fuel source and for enabling delivering fuel via the first boom lumen;

wherein the second boom member portion includes a second boom lumen, a second boom axis, and a fuel delivery end, the fuel delivery end comprising a fuel delivery nozzle configured for selectively engaging with a fuel receptacle of the receiver aircraft;

wherein the connect/disconnect mechanism is configured for:

selectively enabling the first boom member portion to be connected with respect to the second boom member portion to provide a connected configuration, such that free fluid communication is provided between the first boom lumen and the second boom lumen; and selectively enabling actively disconnecting the first boom member portion with respect to the second boom member portion to provide a disconnected configuration responsive to receiving a disconnection activation signal;

wherein, in said disconnected configuration, the second boom member portion is fully detached from and no longer physically connected directly to the first boom member portion.

2. The boom member according to claim 1, wherein said connect/disconnect mechanism is initially in said connected configuration, and wherein said connect/disconnect mechanism is electrically actuated via said disconnection activation signal to provide said disconnected configuration.

3. The boom member according to claim 2, wherein said connect/disconnect mechanism comprises a mechanical coupling arrangement and an electrically actuable locking mechanism, wherein the mechanical coupling arrangement comprises a first coupling element affixed to the first boom member portion, a second coupling element affixed to the second boom member portion, and wherein the electrically actuable locking mechanism is configured for selectively locking together the first coupling element with respect to the second coupling element in said connected configuration when the electrically actuable locking mechanism is deactivated, and for selectively unlocking the first coupling element with respect to the second coupling element in said disconnected configuration when the electrically actuable locking mechanism is electrically activated via said disconnection activation signal.

4. The boom member according to claim 3, wherein the first coupling element comprises a first cylindrical flange and the second coupling element comprises a second cylindrical flange, wherein in the connected configuration the first cylindrical flange and the second cylindrical flange are co-axial with respect to said second boom axis, and in sealing engagement with respect to one another.

5. The boom member according to claim 4, wherein the electrically actuable locking mechanism further comprises a plurality of locking elements and a collar, and is configured for:

enabling said locking elements to lock together the first cylindrical flange and the second cylindrical flange in said connected configuration when the collar is in a locking position with respect to the first cylindrical flange and the second cylindrical flange; and enabling said locking elements to unlock the first cylindrical flange and the second cylindrical flange in said connected configuration when the collar is in a locking position with respect the first cylindrical flange and the second cylindrical flange.

6. A boom member configured to enabling in-flight refueling of a receiver aircraft, the boom member comprising:

a first boom member portion;

a second boom member portion; and a connect/disconnect mechanism;

wherein the first boom member portion includes a first boom lumen, a first boom axis, and a fuel receiving end, the fuel receiving end configured for receiving fuel from a fuel source and for enabling delivering fuel via the first boom lumen;

wherein the second boom member portion includes a second boom lumen, a second boom axis, and a fuel delivery end, the fuel delivery end comprising a fuel delivery nozzle configured for selectively engaging with a fuel receptacle of the receiver aircraft;

wherein the connect/disconnect mechanism is configured for:

selectively enabling the first boom member portion to be connected with respect to the second boom member portion to provide a connected configuration, such that free fluid communication is provided between the first boom lumen and the second boom lumen; and selectively enabling actively disconnecting the first boom member portion with respect to the second boom member portion to provide a disconnected configuration responsive to receiving a disconnection activation signal;

wherein in said disconnected configuration the second boom member portion is fully detached from, and thus no longer physically connected directly to, the first boom member portion;

wherein said connect/disconnect mechanism comprises a mechanical coupling arrangement and an electrically actuable locking mechanism, wherein the mechanical coupling arrangement comprises a first coupling element affixed to the first boom member portion, a second coupling element affixed to the second boom member portion, and wherein the electrically actuable locking mechanism is configured for selectively locking together the first coupling element with respect to the second coupling element in said connected configuration when the electrically actuable locking mechanism is deactivated, and for selectively unlocking the first coupling element with respect to the second coupling element in said disconnected configuration when the electrically actuable locking mechanism is electrically activated via said disconnection activation signal;

wherein the first coupling element comprises a first cylindrical flange and the second coupling element comprises a second cylindrical flange, wherein in the connected configuration the first cylindrical flange and the second cylindrical flange are co-axial with respect to said second boom axis, and in sealing engagement with respect to one another;

wherein the electrically actuable locking mechanism further comprises a plurality of locking elements and is configured for:

enabling said locking elements to lock together the first cylindrical flange and the second cylindrical flange in said connected configuration when the collar is in a locking position with respect to the first cylindrical flange and the second cylindrical flange; and enabling said locking elements to unlock the first cylindrical flange and the second cylindrical flange in said connected configuration when the collar is in a locking position with respect to the first cylindrical flange and the second cylindrical flange; and wherein said locking elements are in the form of a plurality of balls, each ball having a nominally identical respective ball diameter, and wherein said first cylindrical flange comprises a first outer surface and a first inner surface, radially spaced from one another by a first flange thickness, and wherein said first cylindrical flange comprises a plurality of ball chambers in circumferentially arranged relationship therewith, each said ball chamber accommodating one said ball, wherein said first cylindrical flange further comprises a through-opening to said first inner surface to allow only a part of each corresponding ball accommodated in the respective said ball chamber to project out of the respective said through-opening, wherein said radial thickness is less than each said ball diameter, and wherein said electrically actuable locking mechanism further comprises a collar movably mounted with respect to the first cylindrical flange and in overlying relationship with the first outer surface, the collar comprising a plurality of recesses corresponding to said plurality of ball chambers, and wherein said collar is movable between a locking position and an unlocking position, wherein in the locking position the collar locks the balls in a projecting position with respect to each respective said opening, and wherein in said unlocking position the collar enables the balls to recess into the respective ball chambers away from the respective projecting positions.

7. The boom member according to claim 6, including one of the following:

wherein in said unlocking position said recesses are in radial alignment with respect to said ball chambers, and wherein in said locking position said recesses are radially non-aligned with respect to said ball chambers; wherein each said recess is sized such as to enable a respective said ball to be radially displaced thereinto and away from the respective projecting position; or wherein said second cylindrical flange comprises a second outer surface comprising a plurality of locking grooves in circumferentially arranged relationship therewith, such that in said locking position each said ball projects away from each respective said opening in a respective said projecting position and into a locking configuration with a respective said locking groove, such as to prevent relative movement between said first cylindrical flange and said second cylindrical flange.

8. The boom member according to claim 6, including one of the following:

wherein said collar comprises a mechanical stop, and said electrically actuable locking mechanism comprises a release solenoid arrangement configured for selectively cooperating with the mechanical stop, such that in the absence of said disconnection activation signal the release solenoid arrangement prevents movement of the collar from the locking position, and such that in response to said disconnection activation signal the release solenoid arrangement allows movement of the collar from the locking position to the unlocking position; or wherein said collar comprises a mechanical stop, and said electrically actuable locking mechanism comprises a release solenoid arrangement configured for selectively cooperating with the mechanical stop, such that in the absence of said disconnection activation signal the release solenoid arrangement prevents movement of the collar from the locking position, and such that in response to said disconnection activation signal the release solenoid arrangement allows movement of the collar from the locking position to the unlocking position, and, wherein said release solenoid arrangement comprises a solenoid and a piston element reciprocable between a first position, corresponding to said locking position, and a second position, corresponding to said unlocking position, responsive to said solenoid being energized via said disconnection activation signal, the piston element comprising a retaining pin configured for selectively cooperating with said mechanical stop, and a biasing spring configured for biasing the piston element into the second position.

9. The boom member according to claim 6, including one of the following:

wherein said collar is biased into the unlocking position; or wherein said collar is biased into the unlocking position, and, comprising a torsion spring mounted at one longitudinal end thereof to said first cylindrical flange and at another longitudinal end thereof to said collar, and configured for biasing the collar into the unlocking position.

10. The boom member according to claim 6, including one of the following:

wherein the collar is rotatably mounted with respect to the first cylindrical flange about a reference axis, between a first angular position corresponding to said locking position and a second angular position corresponding to said unlocking position, wherein said reference axis is co-axial with said second boom axis;

wherein the collar is axially mounted with respect to the first cylindrical flange along a reference axis, between a first axial position corresponding to said locking position and a second axial position corresponding to said unlocking position, wherein said reference axis is co-axial with said second boom axis; or wherein the collar is axially and rotatably mounted with respect to the first cylindrical flange with respect to a reference axis, between a first axial/angular position corresponding to said locking position and a second axial/angular position corresponding to said unlocking position, wherein said reference axis is co-axial with said second boom axis.

11. The boom member according to claim 1, wherein at least an aft part of the first boom member portion, and at least a forward part of the second boom member portion are rectilinear and co-axial with respect to one another.

12. The boom member according to claim 11, including one of:

wherein the first boom member portion comprises a fore part connected to the aft part of the first boom member portion via an elbow portion; or wherein the second boom member portion is rectilinear.

13. The boom member according to claim 1, wherein the boom member is provided by a refueling device, wherein said connect/disconnect mechanism is configured for enabling selective active disconnection between the receiver aircraft and the refueling device in an essentially non-destructive manner, and in which the second boom member portion is configured to remain engaged in the receiver aircraft after such disconnection, such that the second boom member portion is fully disconnected from the remainder of the refueling device, and such that the receiver aircraft with the second boom member portion can then fly independently of the remainder of the refueling device.

14. The boom member according to claim 1, wherein the boom member is provided by a refueling device, and wherein said connect/disconnect mechanism is configured for enabling selective active disconnection between the receiver aircraft and the refueling device in-flight.

15. The boom member according to claim 1, wherein the boom member is provided by a refueling device, and wherein said connect/disconnect mechanism is configured for enabling reversible disconnection between the receiver aircraft and the refueling device.

16. A refueling device for use in in-flight refueling operation, the refueling device comprising:

a body configured for being towed by a tanker aircraft in a forward direction via a fuel hose at least during in-flight refueling operation, the body having a body longitudinal axis;

a spatial control system configured for selectively providing stability and control to the refueling device;

a boom member as defined in claim 1, the boom member being carried by the body.

17. The refueling device according to claim 16, including one of the following:

wherein the boom member is reversibly pivotable with respect to the body, between a boom stowed position and a boom deployed position, wherein in the boom stowed position the refueling nozzle is closer to the body than in the boom deployed position, and wherein in the boom deployed position engagement with the fuel receptacle of the receiver aircraft is possible;

wherein said boom member is in fixed spatial relationship with respect to the body;

wherein said spatial control system is further configured for selectively providing control moments in at least one of pitch, yaw and roll wherein to enable the refueling device to be flown while towed by the tanker aircraft in said forward direction via said fuel hose;

wherein said spatial control system comprises selectively controllable aerodynamic control system;

wherein said spatial control system comprises selectively controllable aerodynamic control system, and, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces;

wherein said body further comprises a longitudinal displacement control system, different from the spatial control system;

wherein the refueling device further comprises a force generating arrangement configured for selectively generating a force along said second boom axis in a direction towards said fuel delivery nozzle;

wherein the refueling device further comprises a force generating arrangement configured for selectively generating a force along said second boom axis in a direction towards said fuel delivery nozzle, and, wherein said force generating arrangement is configured for selectively generating said force along said second boom axis in a direction towards said fuel delivery nozzle responsive to said fuel delivery nozzle being in predetermined proximity to the fuel receptacle of the receiver aircraft wherein to force said fuel delivery nozzle into engagement with the fuel receptacle; or wherein said body comprises a fuel delivery lumen configured for fluid communication with said fuel hose and said boom member at least during the in-flight refueling operation, wherein said body comprises a coupling having a hose interface configured for connecting said lumen to the fuel hose, said coupling configured for allowing relative rotation between the hose and said body in at least one degree of freedom while maintaining said fuel communication.

18. A refueling system comprising a refueling fuel reservoir connected to a refueling device via a hose, the refueling device being as defined in claim 16.

19. A tanker aircraft comprising at least one refueling system as defined in claim 18.

20. A method for in-flight refueling, the method comprising:

providing a tanker aircraft as defined in claim 19;

deploying the refueling device aft of the tanker aircraft when airborne;

engaging the fuel delivery nozzle to a receiver aircraft;

selectively providing said disconnection activation signal to the boom member to thereby disconnect the first boom member portion with respect to the second boom member portion to provide said disconnected configuration; and allowing the receiving aircraft to separate from the respective said body while said delivery nozzle is engaged to said receiver aircraft.

* * * * *